(12) United States Patent
Fukuda et al.

(10) Patent No.: US 11,168,229 B2
(45) Date of Patent: Nov. 9, 2021

(54) INKJET LIQUID COMPOSITION

(71) Applicant: KAO CORPORATION, Tokyo (JP)

(72) Inventors: Teruyuki Fukuda, Wakayama (JP); Satoshi Kunii, Wakayama (JP); Satoshi Tanaka, Wakayama (JP); Yuki Suzuki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/640,995

(22) PCT Filed: Aug. 24, 2017

(86) PCT No.: PCT/JP2017/030385
§ 371 (c)(1),
(2) Date: Feb. 21, 2020

(87) PCT Pub. No.: WO2019/038894
PCT Pub. Date: Feb. 28, 2019

(65) Prior Publication Data
US 2020/0216698 A1    Jul. 9, 2020

(51) Int. Cl.
*C09D 11/38* (2014.01)
*B41M 5/00* (2006.01)
(Continued)

(52) U.S. Cl.
CPC ............ *C09D 11/38* (2013.01); *B41J 2/2107* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,431,720 A * 7/1995 Nagai ................... C09D 11/38
106/31.43
8,556,403 B2   10/2013 Fukuda
(Continued)

FOREIGN PATENT DOCUMENTS

CN    1377928 A    11/2002
CN    100383202 C    4/2008
(Continued)

OTHER PUBLICATIONS

Extended European Search Report for European Application No. 17922113.0, dated Feb. 12, 2021.
(Continued)

*Primary Examiner* — Manish S Shah
(74) *Attorney, Agent, or Firm* — Birch, Stewart, Kolasch & Birch, LLP

(57) ABSTRACT

The present invention relates to a liquid composition for ink-jet printing which is capable of forming a protective film on a liquid ejection head of an ink-jet type to enhance insulating properties for the liquid ejection head, an image-forming method, a method of forming the protective film, a storing method, and a use of the liquid composition. The present invention provides [1] a liquid composition for ink-jet printing which contains not less than 0.01% by mass and not more than 1.50% by mass of a compound represented by the following formula (1) or a salt thereof, not less than 0.05% by mass and not more than 35% by mass of a compound represented by the following formula (2), and water, [2] an ink-jet image-forming method including the step of ejecting the liquid composition for ink-jet printing according to the above [1] from a liquid ejection head of an ink-jet type including an ejection energy-generating element to form characters or images, [3] a method of forming a protective film on a liquid ejection head of an ink-jet type including an ejection energy-generating element, including
(Continued)

the step of applying a voltage to the ejection energy-generating element under such a condition that the ejection energy-generating element is allowed to contact with the liquid composition according to the above [1], [4] a method of storing a liquid ejection head of an ink-jet type including an ejection energy-generating element, including the steps of applying a voltage to the ejection energy-generating element under such a condition that the ejection energy-generating element is allowed to contact with the liquid composition according to the above [1], and filling the liquid ejection head with an ink after the step of applying a voltage, and [5] a use of the liquid composition according to the above [1], as a filling liquid or an ink;

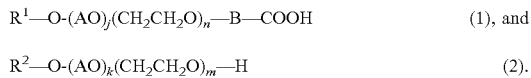

$$R^1\text{—O-}(AO)_j(CH_2CH_2O)_n\text{—B—COOH} \quad (1), \text{ and}$$

$$R^2\text{—O-}(AO)_k(CH_2CH_2O)_m\text{—H} \quad (2).$$

20 Claims, 1 Drawing Sheet

(51) Int. Cl.
    *C09D 11/107*     (2014.01)
    *C09D 11/324*     (2014.01)
    *C08K 3/04*     (2006.01)
    *B41J 2/21*     (2006.01)

(52) U.S. Cl.
    CPC .......... *C09D 11/107* (2013.01); *C09D 11/324* (2013.01); *C08K 3/04* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/045; B41J 11/0015; B41J 11/002; B41J 2/04581; B41J 2/055; B41J 2/16538; B41J 2/14201; B41J 2002/165; B41J 229/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2002/16502; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 8,596,776 | B2 | 12/2013 | Fukuda |
| 2003/0038869 | A1* | 2/2003 | Kaneko ................. C09D 11/30 347/100 |
| 2003/0039849 | A1 | 2/2003 | Inbe et al. |
| 2004/0110655 | A1* | 6/2004 | Yamashita .............. C11D 1/72 510/421 |
| 2005/0054751 | A1* | 3/2005 | Namba ................. C09D 11/322 523/160 |
| 2007/0185256 | A1* | 8/2007 | Wulff ................... C09D 171/02 524/523 |
| 2007/0213443 | A1 | 9/2007 | Fine et al. |
| 2010/0047453 | A1 | 2/2010 | Sao et al. |
| 2010/0092672 | A1 | 4/2010 | Kawakami et al. |
| 2014/0192112 | A1* | 7/2014 | Nagashima ................ B41J 2/01 347/21 |

FOREIGN PATENT DOCUMENTS

| | | |
|---|---|---|
| EP | 1 243 625 A1 | 9/2002 |
| JP | 4-173339 A | 6/1992 |
| JP | 2000-127419 A | 5/2000 |
| JP | 2001-49292 A | 2/2001 |
| JP | 2001-139849 A | 5/2001 |
| JP | 2001-187849 A | 7/2001 |
| JP | 2003-3098 A | 1/2003 |
| JP | 2003-213179 A | 7/2003 |
| JP | 2004-66599 A | 3/2004 |
| JP | 2007-307876 A | 11/2007 |
| JP | 2009-287014 A | 12/2009 |
| JP | 2009-287015 A | 12/2009 |
| JP | 2010-37363 A | 2/2010 |
| JP | 2010-47714 A | 3/2010 |
| JP | 2010-53215 A | 3/2010 |
| JP | 2010-94843 A | 4/2010 |
| JP | 2012-15422 A | 1/2012 |
| JP | 2012-187904 A | 10/2012 |
| JP | 2015-881 A | 1/2015 |

OTHER PUBLICATIONS

International Search Report issued in PCT/JP2017/030385 (PCT/ISA210), dated Nov. 14, 2017.

* cited by examiner

INKJET LIQUID COMPOSITION

FIELD OF THE INVENTION

The present invention relates to a liquid composition for ink-jet printing, an image-forming method, a method of forming a protective film, a storing method, and a use of the liquid composition.

BACKGROUND OF THE INVENTION

In ink-jet printing methods, droplets of ink are directly ejected onto a printing medium from very fine ejection ports of a liquid ejection head and allowed to adhere to the printing medium to form characters or images on the printing medium. The ink-jet printing methods have become rapidly spread because of various advantages such as easiness of full coloration, low cost, capability of using a plain paper as the printing medium, printability in non-contact with the printing medium, etc.

Various kinds of ink compositions have been conventionally used in the ink-jet printing methods. For example, as such an ink composition, there is known an aqueous ink composition containing water as a main component.

In order to prevent the liquid ejection head from suffering from corrosion by the aqueous ink composition, studies have been made on provision of a coating over respective members thereof.

For example, Patent Literature 1 discloses an ink-jet print head including a pressure-generating member that is free of possible breakage or failure upon contact with an ink by coating the pressure-generating member with a moisture-proof material, in which an ink contact surface of the pressure-generating member is covered with a coating material.

In addition, studies have also been made on a water-based ink containing a corrosion inhibitor. For example, in Patent Literature 2, as such a corrosion inhibitors there are mentioned an acetylene alcohol, an amine-based compound, a nitric acid salt, etc.

CITATION LIST

Patent Literatures

Patent Literature 1: JP 4-173339A
Patent Literature 2: JP 2001-187849A

SUMMARY OF THE INVENTION

The present invention relates to the following aspects [1] to [5].

[1] A liquid composition for ink-jet printing, containing not less than 0.01% by mass and not more than 1.5% by mass of a compound represented by the following formula (1) or a salt thereof, not less than 0.05% by mass and not more than 35% by mass of a compound represented by the following formula (2), and water:

$$R^1\text{---}O\text{-}(AO)_j(CH_2CH_2O)_n\text{---}B\text{---}COOH \quad (1),$$

wherein $R^1$ is a linear or branched aliphatic hydrocarbon group having not less than 2 and not more than 8 carbon atoms, or an alicyclic hydrocarbon group having not less than 3 and not more than 8 carbon atoms; AO is an alkyleneoxy group having 3 or 4 carbon atoms; B is an alkylene group having not less than 1 and not more than 3 carbon atoms; and j and n represent average molar numbers of addition of (AO) and ($CH_2CH_2O$), respectively, in which j is a number of not less than 0 and not more than 1, n is a number of not less than 5 and not more than 20, and when j is more than 0 (j>0), the groups of (AO) and ($CH_2CH_2O$) may be arranged in any order; and $$R^2\text{---}O\text{-}(AO)_k(CH_2CH_2O)_m\text{---}H \quad (2),$$
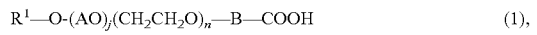

wherein $R^2$ is a linear or branched aliphatic hydrocarbon group having not less than 2 and not more than 8 carbon atoms, or an alicyclic hydrocarbon group having not less than 3 and not more than 8 carbon atoms; AO is an alkyleneoxy group having 3 or 4 carbon atoms; and k and m represent average molar numbers of addition of (AO) and ($CH_2CH_2O$), respectively, in which k is a number of not less than 0 and not more than 1, m is a number of not less than 6 and not more than 21, and when k is more than 0 (k>0), the groups of (AO) and ($CH_2CH_2O$) may be arranged in any order.

[2] An ink-jet image-forming method including the step of ejecting the liquid composition for ink-jet printing according to the above aspect [1] from a liquid ejection head of an ink-jet type including an ejection energy-generating element to form characters or images.

[3] A method of forming a protective film on a liquid ejection head of an ink-jet type including an ejection energy-generating element, including the step of applying a voltage to the ejection energy-generating element under such a condition that the ejection energy-generating element is allowed to contact with the liquid composition according to the above aspect [1].

[4] A method of storing a liquid ejection head of an ink-jet type including an ejection energy-generating element, including the steps of:

applying a voltage to the ejection energy-generating element under such a condition that the ejection energy-generating element is allowed to contact with the liquid composition according to the above aspect [1]; and filling the liquid ejection head with an ink after the step of applying the voltage to the ejection energy-generating element.

[5] A use of the liquid composition according to the above aspect [1] as a filling liquid or an ink.

DETAILED DESCRIPTION OF THE INVENTION

Figure 1:
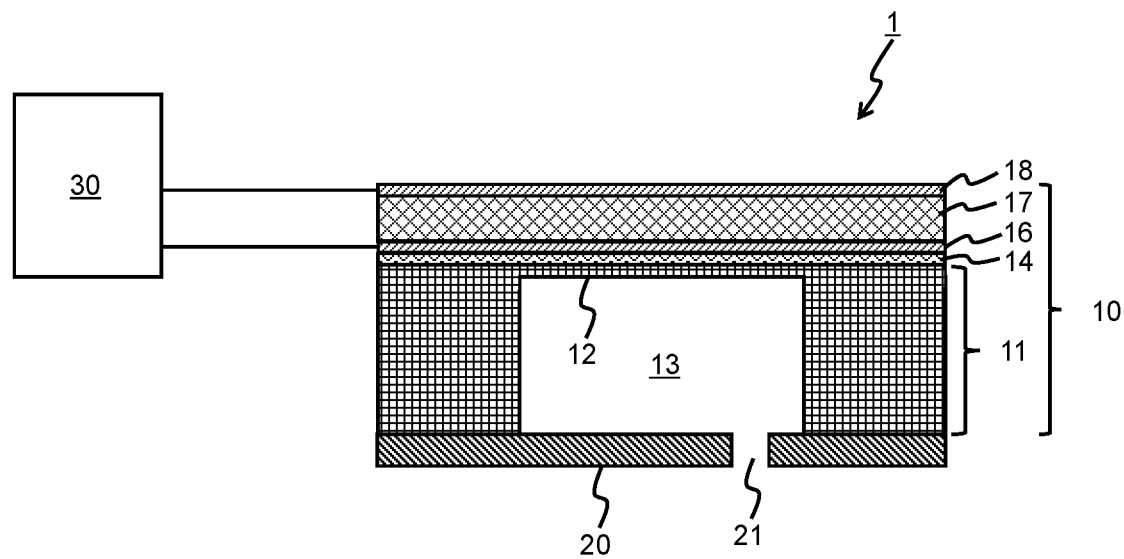
FIG. 1 is a sectional view showing an example of a construction of a print head 1 according to a first embodiment of the present invention.

Upon production of a liquid ejection head of an ink-jet type, a fine structure of the liquid ejection head is formed by laminating layers of a metal, a metal oxide or the like by micro-processing technologies used in semiconductor manufacturing processes, etc. Thus, the liquid ejection head has such a structure that an ink is brought into contact with the metal or the metal oxide. For this reason, if an aqueous ink is used as the ink to be filled in the liquid ejection head, there tends to arise such a problem that the metal, the metal oxide or the like as a material constituting the liquid ejection head suffers from deterioration in quality thereof owing to corrosion, etc.

Moreover, the liquid ejection head is constructed such that electrodes for energizing a piezoelectric element in the case of a piezoelectric type head or an electro-thermal conversion element in the case of a thermal type head are disposed inside thereof. Since a voltage applied to the electrodes is 1.23 V (vs SHE) or more at which water undergoes electrolysis, an electric current leaked from the electrodes readily induces electrolysis of water in the aqueous ink used therein, so that hydrogen gas or oxygen gas tends to be generated from the ink. In addition, if the ink containing chlorine is used, chlorine gas having higher corrosiveness tends to be generated by the electrolysis.

To solve the aforementioned problem, in the Patent Literature 1, there is described the ink-jet head that is characterized by covering an ink-contact surface of the pressure-generating member with a coating material such as an epoxy compound, a silicone, $SiO_2$, SiN, $Ta_2O_5$ or the like. However, even if a protective film made of such a coating material is formed over the pressure-generating member, not only variation in quality of the protective film in a production process thereof, but also formation of fine cracks in the protective film as well as delamination between the protective film and the electrodes or driving elements owing to deformation of the piezoelectric element upon ejection of the ink or thermal expansion of a heater tend to be induced, so that the protective film tends to sometimes fail to exhibit its good performance as expected.

In addition, the formation of such a protective film on the pressure-generating member corresponds to enlargement of the structure of the liquid ejection head per one nozzle thereof and increase in production cost owing to increase in number of steps in the production process, and therefore tends to be reflected on initial cost and costs for operation and maintenance of the ink-jet printing apparatus. Thus, the formation of the protective film is undesirable from the standpoint of providing consumers with printed materials having high-definition images at the lowest possible cost.

Also, in the water-based ink described in the Patent Literature 2, it is necessary that the ink is kept in an acidic state from the viewpoint of improving ejection stability thereof.

The present invention relates to a liquid composition for ink-jet printing which is capable of forming a protective film for enhancing insulating properties for a liquid ejection head of an ink-jet type, an image-forming method, a method of forming a protective film, a method of storing the liquid ejection head, and a use of the liquid composition.

The present inventors have found that when using a liquid composition containing a compound represented by the formula (1) and a compound represented by the formula (2), it is possible to form a protective film that is capable of enhancing insulating properties for a liquid ejection head of an ink-jet type against the liquid composition.

That is, the present invention relates to the aforementioned aspects [1] to [5].

In accordance with the present invention, it is possible to provide a liquid composition for ink-jet printing which is capable of forming a protective film for enhancing insulating properties for a liquid ejection head of an ink-jet type, an image-forming method, a method of forming a protective film, a storing method, and a use of the liquid composition.

[Liquid Composition for Ink-Jet Printing]

The liquid composition for ink-jet printing according to the present invention (hereinafter also referred to merely as a "liquid composition") contains not less than 0.01% by mass and not more than 1.5% by mass of a compound represented by the following formula (1) or a salt thereof (hereinafter also referred to merely as a "compound 1"), not less than 0.05% by mass and not more than 20% by mass of a compound represented by the following formula (2) (hereinafter also referred to merely as a "compound 2"), and water:

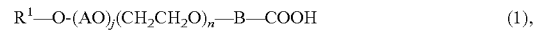
$$R^1\text{—O-(AO)}_j(CH_2CH_2O)_n\text{—B—COOH} \qquad (1),$$

wherein $R^1$ is a linear or branched aliphatic hydrocarbon group having not less than 2 and not more than 8 carbon atoms, or an alicyclic hydrocarbon group having not less than 3 and not more than 8 carbon atoms; AO is an alkyleneoxy group having 3 or 4 carbon atoms; B is an alkylene group having not less than 1 and not more than 3 carbon atoms; and j and n represent average molar numbers of addition of (AO) and ($CH_2CH_2O$), respectively, in which j is a number of not less than 0 and not more than 1, n is a number of not less than 5 and not more than 20, and when j is more than 0 (j>0), the groups of (AO) and ($CH_2CH_2O$) may be arranged in any order; and

$$R^2\text{—O-(AO)}_k(CH_2CH_2O)_m\text{—H} \qquad (2),$$

wherein $R^2$ is a linear or branched aliphatic hydrocarbon group having not less than 2 and not more than 8 carbon atoms, or an alicyclic hydrocarbon group having not less than 3 and not more than 8 carbon atoms; AO is an alkyleneoxy group having 3 or 4 carbon atoms; and k and m represent average molar numbers of addition of (AO) and ($CH_2CH_2O$), respectively, in which k is a number of not less than 0 and not more than 1, m is a number of not less than 6 and not more than 21, and when k is more than 0 (k>0), the groups of (AO) and ($CH_2CH_2O$) may be arranged in any order.

The reason why the liquid composition of the present invention is capable of forming a protective film for enhancing insulating properties for a liquid ejection head of an ink-jet type is considered as follows, though it is not clearly determined yet.

That is, electrodes used as members of the liquid ejection head which are formed of a metal or a conductive metal oxide, or a compound as an insulating material which however exhibits substantially no insulating properties owing to a thin film shape thereof, are separated into a cathode (negative electrode) side and an anode (positive electrode) side when applying a voltage thereto, and then respectively become showing their inherent properties. In addition, even though the electrodes macroscopically exhibit anodic and cathodic properties, respectively, when observed in a microscopic sense, cathodes and anodes are locally produced thereon, so that the electrodes become showing the respective inherent properties.

It is considered that carboxy groups of the compound 1 (i.e., a polyoxyethylene alkylether acetic acid or a salt thereof) which is contained in the liquid composition of the present invention are microscopically orientated on a surface of the anode, so that the surface of the electrode is coated with the compound 1.

However, orientation of the compound 1 that is collected over the surface of the electrode so as to densely orientate thereon is disturbed by repulsion between the same polarities of the carboxy groups thereof, so that the compound 1 by itself fails to form a dense protective film on the surface of the electrode.

On the other hand, in the present invention, it is considered that by using the compound 1 in combination with a predetermined amount of the compound 2 having a similar structure to that of the compound 1, the carboxy groups of the compound 1 can be orientated at restricted adsorbing sites on the surface of the electrode, and the compound 2 having the similar structure acts for burying voids therebetween, so that it is possible to form a dense protective film on the surface of the metal or the conductive metal oxide. It is considered that the thus formed protective film not only prevents generation of oxygen or an acid which causes corrosion of the respective electrodes, but also inhibits adsorption of halogen ions such as typically chlorine ions which can be firmly adsorbed onto the surface of the metal or the conductive metal oxide even at cathodic sites owing to high electronegativity thereof.

As a result, it is considered that by preventing oxygen, water and chlorine to approach to the surface of the respective electrodes, it is possible to form a protective film that is capable of enhancing insulating properties thereof.

In the following, the respective components of the liquid composition are explained in detail.

The expression "for ink-jet printing" as used herein means the use or applications in which an ink or the like liquid is introduced into an ink tank of an ink-jet printing apparatus. The liquid composition for ink-jet printing as used in the present invention includes an ink or a filling liquid that is used for shipping or maintenance of the apparatus, which are to be filled into a liquid ejection head of an ink-jet print head, etc.

The composition of the present invention may be in the form of a liquid composition for ink-jet printing which is prepared by compounding not less than 0.01% by mass and not more than 1.5% by mass of a compound represented by the following formula (1) or a salt thereof, and not less than 0.05% by mass and not more than 20% by mass of a compound represented by the following formula (2). In the case where the liquid composition for ink-jet printing is prepared by compounding the compound represented by the formula (1) or a salt thereof and the compound represented by the formula (2), the "content(s)" described in the present specification should also be read as "compounding amount(s)".

<Compound 1>

The compound 1 is a compound represented by the following formula (1) or a salt thereof.

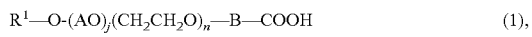

$$R^1\text{—O-}(AO)_j(CH_2CH_2O)_n\text{—B—COOH} \quad (1),$$

wherein $R^1$ is a linear or branched aliphatic hydrocarbon group having not less than 2 and not more than 8 carbon atoms, or an alicyclic hydrocarbon group having not less than 3 and not more than 8 carbon atoms; AO is an alkyleneoxy group having 3 or 4 carbon atoms; B is an alkylene group having not less than 1 and not more than 3 carbon atoms; and j and n represent average molar numbers of addition of (AO) and ($CH_2CH_2O$), respectively, in which j is a number of not less than 0 and not more than 1, n is a number of not less than 5 and not more than 20, and when j is more than 0 (j>0), the groups of (AO) and ($CH_2CH_2O$) may be arranged in any order.

$R^1$ is preferably a linear or branched aliphatic hydrocarbon group. The aliphatic hydrocarbon group as $R^1$ is preferably a linear aliphatic hydrocarbon group from the viewpoint of improving insulating properties of the obtained protective film.

The aliphatic hydrocarbon group as $R^1$ is in the form of a saturated or unsaturated aliphatic hydrocarbon group, and preferably a saturated aliphatic hydrocarbon group.

The number of carbon atoms in the aliphatic hydrocarbon group as $R^1$ is preferably not less than 3, more preferably not less than 4 and even more preferably not less than 5, and is also preferably not more than 7 and more preferably not more than 6, from the viewpoint of further improving insulating properties of the obtained protective film.

Examples of $R^1$ in the formula (1) include an ethyl group, a propyl group, a butyl group, a pentyl group, a hexyl group, a heptyl group, an octyl group, a cyclohexyl group, a cycloheptyl group and a cyclooctyl group. Among these aliphatic hydrocarbon groups, preferred are an ethyl group, a butyl group, a hexyl group and an octyl group, more preferred are an ethyl group, a butyl group and a hexyl group, even more preferred is a hexyl group, and further even more preferred is an n-hexyl group.

Examples of B in the formula (1) include a methylene group, an ethylene group and a propylene group. Among these groups, preferred is a methylene group from the viewpoint of further improving insulating properties of the obtained protective film.

Examples of AO in the formula (1) include a propyleneoxy group and a butyleneoxy group.

The suffix n in the formula (1) represents an average molar number of addition of ($CH_2CH_2O$), and is a number of not less than 5 and not more than 20, from the viewpoint of improving insulating properties of the obtained protective film.

From the viewpoint of further improving insulating properties of the obtained protective film, the suffix n in the formula (1) is preferably not more than 19, more preferably not more than 17, even more preferably not more than 15, further even more preferably not more than 13 and still further even more preferably not more than 11, and is also preferably not less than 6, more preferably not less than 7 and even more preferably not less than 8.

The suffix j in the formula (1) is preferably 0 from the viewpoint of further improving insulating properties of the obtained protective film.

Examples of the salt of the compound represented by the formula (1) include alkali metal salts, amine salts and ammonium salts. Specific examples of the alkali metal salts include sodium salts, potassium salts and cesium salts. Specific examples of the amine salts include salts of primary to tertiary organic amines such as propylamine, diethylamine, triethylamine, etc.

As the preferred compound 1, there may be mentioned the following compounds 1-1 to 1-6 and salts thereof.

Compound 1-1: n-Hex-O—($CH_2CH_2O$)$_9$—$CH_2COOH$,

Compound 1-2: $CH_3CH_2$—O—($CH_2CH_2O$)$_9$—$CH_2COOH$,

Compound 1-3: n-Bu-O—($CH_2CH_2O$)$_9$—$CH_2COOH$,

Compound 1-4: n-Oct-O—($CH_2CH_2O$)$_9$—$CH_2COOH$,

Compound 1-5: n-Hex-O—($CH_2CH_2O$)$_5$—$CH_2COOH$, and

Compound 1-6: n-Hex-O—($CH_2CH_2O$)$_{19}$—$CH_2COOH$.

In the aforementioned formulae, "n-Hex" is an n-hexyl group, "n-Bu" is an n-butyl group, and "n-Oct" is an n-octyl group. Incidentally, the numerical value suffixed to the ($CH_2CH_2O$) group represents an average molar number of addition thereof.

The content of the compound 1 in the liquid composition is not less than 0.01% by mass and not more than 1.5% by mass from the viewpoint of further improving insulating properties of the obtained protective film. The content of the compound 1 may be identical to a compounding amount of the compound 1. In addition, in the case where the salt of the compound 1 is used, the content of the compound 1 is calculated as that of an acid type salt thereof. The content of the compound 1 in the liquid composition is preferably not less than 0.02% by mass, more preferably not less than 0.03% by mass, even more preferably not less than 0.05% by mass, further even more preferably not less than 0.08% by mass and still further even more preferably not less than 0.1% by mass, and is also preferably not more than 1.2% by mass, more preferably not more than 1% by mass and even more preferably not more than 0.5% by mass, from the viewpoint of further improving insulating properties of the obtained protective film.

<Compound 2>

The compound 2 is a compound represented by the following formula (2):

$$R^2-O-(AO)_k(CH_2CH_2O)_m-H \quad (2),$$

wherein $R^2$ is a linear or branched aliphatic hydrocarbon group having not less than 2 and not more than 8 carbon atoms, or an alicyclic hydrocarbon group having not less than 3 and not more than 8 carbon atoms; AO is an alkyleneoxy group having 3 or 4 carbon atoms; and k and m represent average molar numbers of addition of (AO) and $(CH_2CH_2O)$, respectively, in which k is a number of not less than 0 and not more than 1, m is a number of not less than 6 and not more than 21, and when k is more than 0 (k>0), the groups of (AO) and $(CH_2CH_2O)$ may be arranged in any order.

Examples of $R^2$ in the formula (2) include the same substituent groups as described above with respect to $R^1$ in the formula (1).

Examples of AO in the formula (2) include the same substituent groups as described above with respect to AO in the formula (1).

The suffix m in the formula (2) represents an average molar number of addition of $(CH_2CH_2O)$, and is a number of not less than 6 and not more than 21, from the viewpoint of further improving insulating properties of the obtained protective film.

From the viewpoint of still further improving insulating properties of the obtained protective film, the suffix m in the formula (2) is preferably not more than 20, more preferably not more than 18, even more preferably not more than 16, further even more preferably not more than 14 and still further even more preferably not more than 12, and is also preferably not less than 7, more preferably not less than 8, even more preferably not less than 9 and further even more preferably not less than 10.

The suffix k in the formula (2) is preferably 0 from the viewpoint of further improving insulating properties of the obtained protective film.

As the preferred compound 2, there may be mentioned the following compounds 2-1 to 2-6.

Compound 2-1: n-Hex-O—$(CH_2CH_2O)_{10}$—H,
Compound 2-2: $CH_3CH_2$—O—$(CH_2CH_2O)_{10}$—H,
Compound 2-3: n-Bu-O—$(CH_2CH_2O)_{10}$—H,
Compound 2-4: n-Oct-O—$(CH_2CH_2O)_{10}$—H,
Compound 2-5: n-Hex-O—$(CH_2CH_2O)_6$—H, and
Compound 2-6: n-Hex-O—$(CH_2CH_2O)_{20}$—H.

In the aforementioned formulae, "n-Hex" is an n-hexyl group, "n-Bu" is an n-butyl group, and "n-Oct" is an n-octyl group. Incidentally, the numerical value suffixed to the $(CH_2CH_2O)$ group represents an average molar number of addition thereof.

The content of the compound 2 in the liquid composition is not less than 0.05% by mass and not more than 35% by mass from the viewpoint of improving insulating properties of the obtained protective film. The content of the compound 2 may be identical to a compounding amount of the compound 2.

The content of the compound 2 in the liquid composition is preferably not less than 0.1% by mass, more preferably not less than 0.2% by mass, even more preferably not less than 1% by mass and further even more preferably not less than 3% by mass, and is also preferably not more than 30% by mass, more preferably not more than 20% by mass and even more preferably not more than 10% by mass, from the viewpoint of further improving insulating properties of the obtained protective film.

The preferred combination of the compound 1 and the compound 2 includes the following configurations.

With respect to the combination of $R^1$ and $R^2$, from the viewpoint of further improving insulating properties of the obtained protective film, the difference between the number of carbon atoms of $R^1$ and the number of carbon atoms of $R^2$ is preferably not more than 2, and it is more preferred that the number of carbon atoms of $R^1$ is identical to the number of carbon atoms of $R^2$.

$R^1$ and $R^2$ are each preferably a linear aliphatic hydrocarbon group from the viewpoint of further improving insulating properties of the obtained protective film.

From the viewpoint of further improving insulating properties of the obtained protective film, the suffixes n and m preferably have the following relationship (A), more preferably have the following relationship (A-1), even more preferably have the following relationship (A-2) and further even more preferably have the following relationship (A-3):

$$m-5 \leq n \leq m+5 \quad (A);$$

$$m-1 \leq n \leq m+1 \quad (A\text{-}1);$$

$$m-1 \leq n \leq m \quad (A\text{-}2); \text{ and}$$

$$m-1=n \quad (A\text{-}3).$$

The average molar numbers (n, m, j and k) of addition of polyalkylene glycol chains in the compound 1 and the compound 2 may be measured by 1H-NMR. These average molar numbers may be calculated from an area ratio of the respective signals with chemical shifts in the range of 3.3 to 3.7 ppm in the case of polyethylene glycol chains, and may also be calculated from an area ratio of the respective signals with chemical shifts in the range of 1.0 to 1.2 ppm in the case of polypropylene glycol chains, etc. Upon measurement of the average molar numbers of addition of the polyalkylene glycol chains, a 5% by mass deuterochloroform solution of the compound to be measured is first prepared, and then 0.05% by volume of tetramethyl silane is further incorporated into the solution.

The measurement of the average molar numbers of addition of the polyalkylene glycol chains in the compound 1 and the compound 2 may be conducted using a 400 MHz NMR apparatus, for example, "Mercury-400" available from Agilent Technologies Inc., under the measuring conditions of swatch width: 6410.3 Hz; data point: 64 K; pulse width: 4.5 µS (45° pulse); pulse delay time: 10 s; cumulative number: 10 times; measuring temperature: room temperature (25° C.); and no spin.

The total content of the compound 1 and the compound 2 in the liquid composition is preferably not less than 0.05% by mass, more preferably not less than 0.1% by mass, even more preferably not less than 0.2% by mass, further even more preferably not less than 1% by mass and still further even more preferably not less than 3% by mass, and is also preferably not more than 35% by mass, more preferably not more than 30% by mass, even more preferably not more than 20% by mass and further even more preferably not more than 10% by mass, from the viewpoint of further improving insulating properties of the obtained protective film.

The mass ratio of the compound 1 to the compound 2 [compound 1/compound 2] is preferably not less than 0.001, more preferably not less than 0.004, even more preferably not less than 0.01 and further even more preferably not less than 0.02, and is also preferably not more than 0.30, more preferably not more than 0.20, even more preferably not more than 0.15, further even more preferably not more than 0.10 and still further even more preferably not more than 0.05, from the viewpoint of further improving insulating properties of the obtained protective film.

<Water>

The liquid composition of the present invention contains water.

The content of water in the liquid composition is preferably not less than 30% by mass, more preferably not less than 40% by mass and even more preferably not less than 50% by mass, and is also preferably not more than 95% by mass and more preferably not more than 90% by mass.

<Colorant>

The liquid composition of the present invention may also contain a colorant. The liquid composition containing the colorant may be used, for example, as an ink, and further may be used as a filling liquid containing the colorant in order to ascertain whether or not clogging of the liquid ejection head occurs.

The colorant may be either a pigment or a dye.

[Pigment]

The pigment used in the liquid composition of the present invention may be either an inorganic pigment or an organic pigment.

Examples of the inorganic pigment include carbon blacks, metal oxides and the like.

The carbon blacks are preferably used as a pigment for black inks.

Examples of the carbon blacks include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the pigment is not particularly limited. In the present invention, there may be used any chromatic pigments having a yellow color, a magenta color, a cyan color, a red color, a blue color, an orange color, a green color, etc.

The pigment used in the present invention may be in the form of a self-dispersible pigment.

The self-dispersible pigment as used herein means a pigment onto a surface of which at least one hydrophilic functional group (including an anionic hydrophilic group such as a carboxy group and a sulfonic group or a cationic hydrophilic group such as a quaternary ammonium group, etc.) is bonded either directly or through the other atom group to thereby render the pigment dispersible in an aqueous medium without using a dispersant. Examples of the other atom group used herein include an alkanediyl group having not less than 1 and not more than 12 carbon atoms, a phenylene group and a naphthylene group.

The amount of the hydrophilic functional group to be bonded to the surface of the pigment is not particularly limited, and is preferably not less than 100 μmol and not more than 3,000 μmol per 1 g of the self-dispersible pigment. In the case where the hydrophilic functional group is a carboxy group, the amount of the carboxy group is preferably not less than 200 μmol and not more than 700 μmol per 1 g of the self-dispersible pigment.

Specific examples of commercially available products of the self-dispersible pigment include "CAB-O-JET" series products available from Cabot Corporation, such as "CAB-O-JET 200", "CAB-O-JET 300", "CAB-O-JET 352K", "CAB-O-JET 250C", "CAB-O-JET 260M", "CAB-O-JET 270Y", "CAB-O-JET 450C", "CAB-O-JET 465M", "CAB-O-JET 470Y" and "CAB-O-JET 480V"; "BONJET" series products available from Orient Chemical Industries Co., Ltd., such as "BONJET CW-1" and "BONJET CW-2"; "Aqua-Black 162" available from Tokai Carbon Co., Ltd.; "SDP100", "SDP1000" and "SDP2000" available from Sensient Technologies Corporation; and the like.

The aforementioned pigments may be used alone or in the form of a mixture containing any two or more thereof at an optional mixing ratio.

[Dyes]

Examples of the dyes include water-soluble dyes, water-dispersible dyes, solvent-soluble dyes and solvent-dispersible dyes. Among these dyes, preferred are water-soluble dyes.

Specific examples of the water-soluble dyes include azo dyes, azomethine dyes, xanthene dyes and quinone dyes. In addition, as the water-soluble dyes, there may be mentioned, for example, direct dyes, acid dyes, reactive dyes and basic dyes.

<Direct Dyes>

Examples of the direct dyes include C.I. Direct Yellow 1, 4, 8, 11, 12, 24, 26, 27, 28, 33, 39, 44, 50, 58, 85, 86, 100, 110, 120, 132, 142 and 144; C.I. Direct Red 1, 2, 4, 9, 11, 13, 17, 20, 23, 24, 28, 31, 33, 37, 39, 44, 47, 48, 51, 62, 63, 75, 79, 80, 81, 83, 89, 90, 94, 95, 99, 220, 224, 227 and 243; C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236 and 237; and C.I. Direct Black 2, 3, 7, 17, 19, 22, 32, 38, 51, 56, 62, 71, 74, 75, 77, 105, 108, 112, 117 and 154.

<Acid Dyes>

Examples of the acid dyes include C.I. Acid Yellow 2, 3, 7, 17, 19, 23, 25, 29, 38, 42, 49, 59, 61, 72 and 99; C.I. Acid Orange 56 and 64; C.I. Acid Red 1, 8, 14, 18, 26, 32, 37, 42, 52, 57, 72, 74, 80, 87, 115, 119, 131, 133, 134, 143, 154, 186, 249, 254 and 256; C.I. Acid Violet 11, 34 and 75; C.I. Acid Blue 1, 7, 9, 29, 87, 126, 138, 171, 175, 183, 234, 236 and 249; C.I. Acid Green 9, 12, 19, 27 and 41; and C.I. Acid Black 1, 2, 7, 24, 26, 48, 52, 58, 60, 94, 107, 109, 110, 119, 131 and 155.

<Reactive Dyes>

Examples of the reactive dyes include C.I. Reactive Yellow 1, 2, 3, 13, 14, 15, 17, 37, 42, 76, 95, 168 and 175; C.I. Reactive Red 2, 6, 11, 21, 22, 23, 24, 33, 45, 111, 112, 114, 180, 218, 226, 228 and 235; C.I. Reactive Blue 7, 14, 15, 18, 19, 21, 25, 38, 49, 72, 77, 176, 203, 220, 230 and 235; C.I. Reactive Orange 5, 12, 13, 35 and 95; C.I. Reactive Brown 7, 11, 33, 37 and 46; C.I. Reactive Green 8 and 19; C.I. Reactive Violet 2, 4, 6, 8, 21, 22 and 25; and C.I. Reactive Black 5, 8, 31 and 39.

<Basic Dyes>

Examples of the basic dyes include C.I. Basic Yellow 11, 14, 21 and 32; C.I. Basic Red 1, 2, 9, 12 and 13; C.I. Basic Violet 3, 7 and 14; C.I. Basic Blue 3, 9, 24 and 25, Basic Blue 3, 9, 24 and 25; and C.I. Food Black 1, 2 and 287, or modified products of these dyes.

[Colorant Particles]

The colorant may be used in the form of colorant particles.

As the colorant particles, there may be mentioned polymer particles containing the colorant and a polymer.

Examples of the polymer include polyesters, polyurethanes, vinyl-based polymers, etc. Among these polymers, from the viewpoint of improving dispersion stability of the colorant particles, preferred are vinyl-based polymers.

<Vinyl-Based Polymers>

Examples of the vinyl-based polymers include addition copolymers prepared by subjecting a monomer mixture containing a hydrophobic monomer (a) and an ionic monomer (b) (hereinafter also referred to merely as a "monomer mixture") to addition copolymerization. In addition, the monomer mixture used for production of the vinyl-based polymers may further contain a nonionic monomer (c).

(Hydrophobic Monomer (a))

Examples of the hydrophobic monomer (a) include an aromatic group-containing monomer and an alkyl (meth)acrylate.

Examples of the aromatic group-containing monomer include vinyl monomers containing an aromatic group having not less than 6 and not more than 22 carbon atoms, such as a styrene-based monomer, an aromatic group-containing (meth)acrylate and the like.

Specific examples of the styrene-based monomer include styrene and 2-methyl styrene. Among these styrene-based monomers, preferred is styrene.

Specific examples of the aromatic group-containing (meth)acrylate include benzyl (meth)acrylate and phenoxyethyl (meth)acrylate. Among these aromatic group-containing (meth)acrylates, preferred is benzyl (meth)acrylate.

Among the aforementioned hydrophobic monomers, from the viewpoint of improving dispersion stability of the colorant particles, preferred is the aromatic group-containing (meth)acrylate. In addition, the aromatic group-containing (meth)acrylate is preferably used in combination with the styrene-based monomer.

The number of carbon atoms in the alkyl group of the alkyl (meth)acrylate is preferably not less than 1 and more preferably not less than 6, and is also preferably not more than 22 and more preferably not more than 18.

Examples of the alkyl (meth)acrylate include methyl (meth)acrylate, ethyl (meth)acrylate, (iso)propyl (meth)acrylate, (iso- or tert-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tert-)" and "(iso)" as used herein mean both of the structure in which any of the groups with these prefixes is present, and the structure in which none of the groups with these prefixes is present (i.e., normal).

As the hydrophobic monomer (a), there may also be used a macromonomer.

The macromonomer is in the form of a polymer containing a polymerizable functional group at one terminal end thereof and having a number-average molecular weight of not less than 500 and not more than 100,000. The number-average molecular weight of the macromonomer is preferably not less than 1,000 and not more than 10,000. Meanwhile, the number-average molecular weight of the macromonomer may be the value measured by gel permeation chromatography using chloroform containing 1 mmol/L of dodecyldimethylamine as a solvent and using polystyrenes as a reference standard substance.

The polymerizable functional group is preferably a (meth)acryloyloxy group and more preferably a methacryloyloxy group.

As the macromonomer, from the viewpoint of improving dispersion stability of a dispersion liquid of the colorant particles, there are preferably used a hydrophobic monomer-derived polymer-based macromonomer and a silicone-based macromonomer. Among these macromonomers, more preferred is the hydrophobic monomer-derived polymer-based macromonomer.

Examples of a hydrophobic monomer constituting the hydrophobic monomer-derived polymer-based macromonomer include the same hydrophobic monomers as described previously. Among these hydrophobic monomers, preferred are styrene and benzyl (meth)acrylate, and more preferred is styrene.

Specific examples of commercially available products of the polystyrene-based macromonomer include "AS-6(S)", "AN-6(S)" and "HS-6(S)" all available from Toagosei Co., Ltd.

Specific examples of the silicone-based macromonomer include organopolysiloxanes containing a polymerizable functional group bonded to one terminal end thereof, etc.

(Ionic Monomer (b))

Examples of the ionic monomer (b) include an anionic monomer and a cationic monomer. Among these ionic monomers, from the viewpoint of improving dispersion stability of the colorant particles, preferred is the anionic monomer.

Examples of the anionic monomer include a carboxylic acid monomer, a sulfonic acid monomer and a phosphoric acid monomer.

Specific examples of the carboxylic acid monomer include acrylic acid, methacrylic acid, crotonic acid, itaconic acid, maleic acid, fumaric acid, citraconic acid and 2-methacryloyloxymethylsuccinic acid.

Specific examples of the sulfonic acid monomer include styrenesulfonic acid, 2-acrylamido-2-methylpropanesulfonic acid and 3-sulfopropyl (meth)acrylate.

Specific examples of the phosphoric acid monomer include vinylphosphonic acid, vinyl phosphate, bis(methacryloxyethyl)phosphate, diphenyl-2-acryloyloxyethyl phosphate and diphenyl-2-methacryloyloxyethyl phosphate.

Among the aforementioned ionic monomers, from the viewpoint of improving dispersion stability of the colorant particles, preferred is the carboxylic acid monomer, more preferred are acrylic acid and methacrylic acid, and even more preferred is methacrylic acid.

(Nonionic Monomer (c))

Examples of the nonionic monomer (c) include hydroxyalkyl (meth)acrylates such as 2-hydroxyethyl (meth)acrylate and 3-hydroxypropyl (meth)acrylate; polyalkylene glycol (meth)acrylates such as a polypropylene glycol (a=2 to 30 wherein a represents an average molar number of addition of oxyalkylene groups: hereinafter defined in the same way) (meth)acrylate; alkoxy polyalkylene glycol (meth)acrylates such as methoxy polyethylene glycol (a=1 to 30) (meth)acrylates; and aryloxy polyalkylene glycol (meth)acrylates such as phenoxy (ethylene glycol/propylene glycol copolymer) (a=1 to 30 in which a for ethylene glycol: 1 to 29) (meth)acrylate.

Among these nonionic monomers, preferred are the polypropylene glycol (a=2 to 30) (meth)acrylate and the phenoxy (ethylene glycol/propylene glycol copolymer) (meth)acrylate, and more preferred is a combination of the polypropylene glycol (a=2 to 30) (meth)acrylate and the phenoxy (ethylene glycol/propylene glycol copolymer) (meth)acrylate.

Specific examples of commercially available products of the nonionic monomer (c) include "NK ESTER" series products available from Shin-Nakamura Chemical Co., Ltd., such as "NK ESTER M-20G", "NK ESTER M-40G", "NK ESTER M-90G" and "NK ESTER EH-4E"; "BLEMMER" series products available from NOF Corporation, such as "BLEMMER PE-90", "BLEMMER PE-200", "BLEMMER PE-350", "BLEMMER PME-100", "BLEMMER PME-200", "BLEMMER PME-400", "BLEMMER PP-500", "BLEMMER PP-800", "BLEMMER AP-150", "BLEMMER AP-400", "BLEMMER AP-550", "BLEMMER 50PEP-300", "BLEMMER 50POEP-800B" and "BLEMMER 43PAPE-600B"; and the like.

The aforementioned hydrophobic monomers (a), ionic monomers (b) and nonionic monomers (c) may be respectively used alone or in combination of any two or more thereof.

Upon production of the polymer, the contents of the respective monomers in the monomer mixture (contents of non-neutralized components; hereinafter defined in the same way) are as follows.

The content of the hydrophobic monomer (a) is preferably not less than 40% by mass, more preferably not less than 45% by mass and even more preferably not less than 50% by mass, and is also preferably not more than 85% by mass, more preferably not more than 80% by mass and even more preferably not more than 75% by mass.

The content of the ionic monomer (b) is preferably not less than 10% by mass, more preferably not less than 13% by mass and even more preferably not less than 15% by mass, and is also preferably not more than 25% by mass, more preferably not more than 23% by mass and even more preferably not more than 20% by mass.

The content of the nonionic monomer (c) is preferably not less than 0% by mass, more preferably not less than 10% by mass and even more preferably not less than 20% by mass, and is also preferably not more than 40% by mass, more preferably not more than 35% by mass and even more preferably not more than 30% by mass.

<Production of Vinyl-Based Polymer>

The vinyl-based polymer may be produced by copolymerizing a mixture containing the aforementioned hydrophobic monomer (a) and ionic monomer (b), and if required, further containing the aforementioned nonionic monomer (c) and the other monomers, by conventionally known polymerization methods. Among the polymerization methods, preferred is a solution polymerization method.

The organic solvent used in the solution polymerization method is not particularly limited, and methyl ethyl ketone, toluene, methyl isobutyl ketone, etc., are preferably used from the viewpoint of attaining good copolymerizability of the monomers.

The polymerization may be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The polymerization temperature is preferably not lower than 50° C., more preferably not lower than 60° C. and even more preferably not lower than 70° C., and is also preferably not higher than 90° C. and more preferably not higher than 85° C. The polymerization time is preferably not less than 1 hour, more preferably not less than 4 hours and even more preferably not less than 6 hours, and is also preferably not more than 20 hours, more preferably not more than 15 hours and even more preferably not more than 10 hours. In addition, the polymerization is preferably conducted in a nitrogen gas atmosphere or an atmosphere of an inert gas such as argon gas.

After completion of the polymerization reaction, unreacted monomers, etc., may be removed from the obtained reaction solution by reprecipitation, membrane separation, chromatography, extraction, etc.

<Weight-Average Molecular Weight of Polymer>

The weight-average molecular weight of the polymer is preferably not less than 5,000, more preferably not less than 10,000, even more preferably not less than 30,000, further even more preferably not less than 40,000 and still further even more preferably not less than 50,000, and is also preferably not more than 500,000, more preferably not more than 300,000, even more preferably not more than 200,000, further even more preferably not more than 150,000 and still further even more preferably not more than 100,000. Meanwhile, the weight-average molecular weight of the polymer may be measured by the method described in Examples below.

[Production of Dispersion Liquid of Colorant Particles]

The dispersion liquid of the colorant particles containing the colorant and the polymer can be efficiently produced by a process including the following steps (1) and (2): Step (1): subjecting a mixture containing the polymer, an organic solvent, the colorant and water to dispersion treatment, thereby obtaining a dispersion treatment product; and Step (2): removing the organic solvent from the dispersion treatment product obtained in the step (1), thereby obtaining the dispersion liquid of the colorant particles.

<Step (1)>

(Organic Solvent)

The organic solvent used in the step (1) preferably an organic solvent having low solubility in water. The solubility in water of the organic solvent as measured at 20° C. is preferably less than 40% by mass.

Examples of the organic solvent include alcohol solvents, ketone-based solvents, ether-based solvents and ester-based solvents. Among these organic solvents, from the viewpoint of improving wettability to the colorant and adsorption of the polymer to the colorant, preferred is methyl ethyl ketone.

The mass ratio of the polymer to the organic solvent [polymer/organic solvent] in the step (1) is preferably not less than 0.10, preferably not less than 0.20 and even more preferably not less than 0.25, and is also preferably not more than 0.60, more preferably not more than 0.50 and even more preferably not more than 0.45, from the viewpoint of improving wettability to the colorant and adsorption of the polymer to the colorant.

(Neutralizing Agent)

From the viewpoint of improving dispersion stability of the colorant particles, a neutralizing agent is preferably used.

When using the neutralizing agent, the neutralization is preferably conducted such that the pH value of the resulting dispersion liquid of the colorant particles lies within the range of not less than 7 and not more than 11.

Examples of the neutralizing agent include hydroxides of alkali metals, ammonia and organic amines. Of these neutralizing agents, preferred are hydroxides of alkali metals and ammonia, and more preferred are hydroxides of alkali metals. Specific examples of the hydroxides of alkali metals include lithium hydroxide, sodium hydroxide, potassium hydroxide and cesium hydroxide. Of these hydroxides of alkali metals, preferred is sodium hydroxide.

The neutralizing agent is preferably used in the form of an aqueous neutralizing agent solution from the viewpoint of sufficiently promoting neutralization of the polymer. The concentration of the aqueous neutralizing agent solution is preferably not less than 3% by mass and more preferably not less than 10% by mass, and is also preferably not more than 30% by mass and more preferably not more than 25% by mass.

The neutralization degree of the polymer is preferably not less than 60 mol %, more preferably not less than 80 mol % and even more preferably not less than 100 mol %, and is also preferably not more than 800 mol %, more preferably not more than 600 mol % and even more preferably not more than 400 mol %, from the viewpoint of improving dispersion stability of the colorant particles.

The neutralization degree as used herein means the value obtained by dividing a mole equivalent amount of the neutralizing agent by a molar amount of acid groups in the polymer. The neutralization degree of the polymer which exceeds 100 mol % means that the neutralizing agent is used in an excessive amount relative to the acid groups of the polymer.

In addition, in the case where the volatile base such as ammonia is used as the neutralizing agent, it is possible to readily control the pH values of the dispersion liquid of the colorant particles and the liquid composition obtained through the step (2) to a desired range even when the neutralization degree of the polymer in the step (1) is increased.

For example, by charging the volatile base in an excessive amount relative to a molar amount of the acid groups of the polymer in the step (1) and then removing the volatile base from the dispersion treatment product in the step (2), it is possible to control the pH value of the resulting dispersion liquid to a desired value as an ink. In the case where the volatile base is used as the neutralizing agent, the amount of the volatile base used is preferably not less than 1 mol %, more preferably not less than 10 mol % and even more preferably not less than 20 mol %, and is also preferably not more than 600 mol %, more preferably not more than 500 mol % and even more preferably not more than 400 mol %.

The content of the colorant in the mixture used in the step (1) is preferably not less than 5% by mass, more preferably not less than 8% by mass and even more preferably not less than 10% by mass, and is also preferably not more than 30% by mass, more preferably not more than 25% by mass and even more preferably not more than 20% by mass, from the viewpoint of improving dispersion stability of the colorant particles.

The content of the polymer in the mixture used in the step (1) is preferably not less than 1.5% by mass, more preferably not less than 2% by mass and even more preferably not less than 2.5% by mass, and is also preferably not more than 15% by mass, more preferably not more than 10% by mass and even more preferably not more than 7% by mass, from the viewpoint of improving dispersion stability of the colorant particles.

The content of the organic solvent in the mixture used in the step (1) is preferably not less than 10% by mass, more preferably not less than 13% by mass and even more preferably not less than 15% by mass, and is also preferably not more than 30% by mass, more preferably not more than 25% by mass and even more preferably not more than 20% by mass, from the viewpoint of improving wettability to the colorant and adsorption of the polymer to the colorant.

The content of water in the mixture used in the step (1) is preferably not less than 50% by mass, more preferably not less than 55% by mass and even more preferably not less than 60% by mass, and is also preferably not more than 80% by mass, more preferably not more than 75% by mass and even more preferably not more than 70% by mass, from the viewpoint of improving dispersion stability of the colorant particles.

The mass ratio of the pigment to the polymer [pigment/polymer] in the step (1) is preferably not less than 50/50, more preferably not less than 60/40 and even more preferably not less than 70/30, and is also preferably not more than 80/20, more preferably not more than 75/25 and even more preferably not more than 65/45, from the viewpoint of improving dispersion stability of the colorant particles.

In the step (1), the dispersing method for obtaining the dispersion treatment product is not particularly limited. The pigment particles may be atomized into fine particles having a desired average particle size by subjecting the mixture to substantial dispersion treatment only. However, it is preferred that the mixture is first subjected to preliminary dispersion treatment, and then to the substantial dispersion treatment by applying a shear stress thereto so as to control the average particle size of the obtained pigment particles to a desired value.

Examples of the apparatus used for the preliminary dispersion treatment include ordinary mixing and stirring devices equipped with an anchor blade, a disper blade and the like. Of these devices, preferred are those mixing and stirring devices equipped with a disper blade, etc.

The temperature used in the preliminary dispersion treatment in the step (1) is preferably not lower than 0° C., and is also preferably not higher than 40° C., more preferably not higher than 20° C. and even more preferably not higher than 10° C.

The treating time of the preliminary dispersion treatment is preferably not less than 1 hour and more preferably not less than 2 hours, and is also preferably not more than 30 hours, more preferably not more than 10 hours and even more preferably not more than 5 hours.

Examples of the apparatus used in the substantial dispersion treatment include kneading machines such as roll mills, kneaders and the like; high-pressure homogenizers; and media-type dispersers such as paint shakers, beads mills and the like.

Examples of the commercially available high-pressure homogenizers include "Microfluidizer" available from Microfluidics Corporation, etc.

Examples of the commercially available media-type dispersers include "Ultra Apex Mill" available from Kotobuki Industries Co., Ltd., and "Pico Mill" available from Asada Iron Works Co., Ltd.

These devices may be used in combination of any two or more thereof.

Among these devices, the high-pressure homogenizers are preferably used from the viewpoint of reducing the particle size of the pigment.

When using the high-pressure homogenizer, the substantial dispersion treatment is preferably conducted under the following treating conditions.

The treating pressure used in the substantial dispersion treatment is preferably not less than 60 MPa and more preferably not less than 100 MPa, and is also preferably not more than 250 MPa and more preferably not more than 200 MPa.

The number of passes through the high-pressure homogenizer used is preferably not less than 3 and more preferably not less than 10, and is also preferably not more than 30 and more preferably not more than 25.

Step (2)

The step (2) of removing the organic solvent from the dispersion treatment product may be conducted by conventionally known methods.

From the viewpoint of suppressing formation of aggregates or flocculates in the course of removing the organic solvent, water may be added to the dispersion treatment product prior to removal of the organic solvent therefrom.

The amount of water added to the dispersion treatment product may be controlled, for example, such that the concentration of non-volatile components in the dispersion liquid obtained after removing the organic solvent lies within the below-mentioned suitable range.

Examples of the apparatus used for removing the organic solvent include a thin film distillation apparatus such as a batch simple distillation device, a reduced pressure distillation device and a flush evaporator, a rotary distillation device, a stirring evaporator and the like.

The temperature used upon removing the organic solvent is preferably not lower than 40° C., and is also preferably not higher than 80° C., more preferably not higher than 70° C. and even more preferably not higher than 65° C.

The pressure of the reaction system as measured at the aforementioned temperature is preferably not less than 0.001 MPa and more preferably not less than 0.002 MPa, and is also preferably not more than 0.05 MPa and more preferably not more than 0.02 MPa.

The time required upon removal of the organic solvent is preferably not less than 1 hour and more preferably not less than 5 hours, and is also preferably not more than 24 hours and more preferably not more than 12 hours.

The organic solvent is preferably substantially completely removed from the obtained dispersion liquid. However, the residual organic solvent may be present in the dispersion liquid unless the objects and advantageous effects of the present invention are adversely affected by the residual organic solvent.

The content of the residual organic solvent in the resulting dispersion liquid is preferably not more than 0.1% by mass and more preferably not more than 0.01% by mass.

The concentration of the non-volatile components in the dispersion liquid (solid content of the dispersion liquid) is preferably not less than 10% by mass and more preferably not less than 15% by mass, and is also preferably not more than 30% by mass and more preferably not more than 25% by mass, from the viewpoint of improving dispersion stability of the dispersion liquid of the colorant particles.

Meanwhile, a part of water contained in the aforementioned dispersion liquid may be removed therefrom simultaneously with removal of the organic solvent.

The volume-average particle size of the colorant particles contained in the dispersion liquid of the colorant particles is preferably not less than 40 nm, more preferably not less than 50 nm and even more preferably not less than 60 nm, and is also preferably not more than 200 nm, more preferably not more than 150 nm and even more preferably not more than 130 nm. The volume-average particle size may be measured by the method described in Examples below.

The content of the colorant in the resulting liquid composition is preferably not less than 1% by mass, more preferably not less than 2% by mass and even more preferably not less than 3% by mass, and is also preferably not more than 30% by mass, more preferably not more than 20% by mass and even more preferably not more than 10% by mass.

Organic Solvent

From the viewpoint of preventing the resulting ink from being dried, the liquid composition preferably contains an organic solvent.

Examples of the organic solvent include glycol ethers other than the compound 2, polyhydric alcohols, monohydric alcohols, alkyl ethers of these alcohols, nitrogen-containing heterocyclic compounds, amides, amines and sulfur-containing compounds. Among these organic solvents, preferred are the glycol ethers, polyhydric alcohols and nitrogen-containing heterocyclic compounds.

Specific examples of the glycol ethers include alkylene glycol monoalkyl ethers and alkylene glycol dialkyl ethers, which are in the form of a compound other than the compound 2. Among these glycol ethers, preferred are alkylene glycol monoalkyl ethers other than the compound 2. The number of carbon atoms in the alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers other than the compound 2 include ethylene glycol ethyl ether, ethylene glycol isopropyl ether, ethylene glycol propyl ether, ethylene glycol butyl ether, diethylene glycol methyl ether, diethylene glycol ethyl ether, diethylene glycol isopropyl ether, diethylene glycol isobutyl ether, diethylene glycol butyl ether, triethylene glycol methyl ether, dipropylene glycol methyl ether, dipropylene glycol ethyl ether, dipropylene glycol butyl ether and tripropylene glycol methyl ether. Of these alkylene glycol monoalkyl ethers, from the viewpoint of preventing the resulting ink from being dried, preferred are ethylene glycol isopropyl ether, ethylene glycol propyl ether, diethylene glycol methyl ether, diethylene glycol isopropyl ether, diethylene glycol isobutyl ether and diethylene glycol butyl ether, and more preferred are ethylene glycol isopropyl ether, diethylene glycol isopropyl ether and diethylene glycol isobutyl ether.

Examples of the polyhydric alcohols include 1,2-alkanediols such as ethylene glycol, propylene glycol, 1,2-butanediol, 1,2-pentanediol and 1,2-hexanediol; and diethylene glycol, polyethylene glycol, dipropylene glycol, polypropylene glycol, 1,3-propanediol, 1,3-butanediol, 1,4-butanediol, 3-methyl-1,3-butanediol, 1,5-pentanediol, 2-methyl-2,4-pentanediol, 1,2,6-hexanetriol, 1,2,4-butanetriol, 1,2,3-butanetriol and petriol.

Examples of the nitrogen-containing heterocyclic compounds include 2-pyrrolidone, N-methyl-2-pyrrolidone, 1,3-dimethyl imidazolidinone and ε-caprolactam. Of these nitrogen-containing heterocyclic compounds, from the viewpoint of preventing the resulting ink from being dried, preferred is 2-pyrrolidone.

Among the aforementioned organic solvents, from the viewpoint of preventing the resulting ink from being dried, preferred are diethylene glycol butyl ether, dipropylene glycol methyl ether, dipropylene glycol ethyl ether, dipropylene glycol butyl ether, propylene glycol, diethylene glycol, polyethylene glycol, polypropylene glycol, and alkanediols having not less than 2 and not more than 6 carbon atoms such as 1,2-hexanediol, and more preferred are propylene glycol and polyethylene glycol.

Meanwhile, the average molecular weight of the polyethylene glycol is preferably not less than 200 and more preferably not less than 400, and is also preferably not more than 2,000 and more preferably not more than 1,000.

The average molecular weight of the polypropylene glycol is preferably not less than 300 and more preferably not less than 400, and is also preferably not more than 1,000 and more preferably not more than 800.

The content of the organic solvent in the liquid composition is preferably not less than 5% by mass, more preferably not less than 8% by mass and even more preferably not less than 10% by mass, and is also preferably not more than 60% by mass, more preferably not more than 50% by mass, even more preferably not more than 40% by mass and further even more preferably not more than 30% by mass, from the viewpoint of improving continuous ejection stability of the resulting ink.

<Surfactant>

The liquid composition may also contain a surfactant other than the compound 2 from the viewpoint of improving continuous ejection stability of the resulting ink.

The surfactant is preferably in the form of a nonionic surfactant.

Examples of the nonionic surfactant include (1) alkyl ethers (except for the compound 2), alkenyl ethers, alkynyl ethers or aryl ethers of polyoxyalkylenes which are produced by adding ethyleneoxide, propyleneoxide or butyleneoxide (hereinafter collectively referred to merely as an "alkyleneoxide") to a saturated or unsaturated, linear or branched higher alcohol having not less than 8 and not more than 22 carbon atoms, a polyhydric alcohol or an aromatic alcohol, (2) esters of a higher alcohol containing a saturated or unsaturated, linear or branched hydrocarbon group having not less than 8 and not more than 22 carbon atoms, and a polyvalent fatty acid, (3) polyoxyalkylene aliphatic amines containing a linear or branched alkyl group or alkenyl group having not less than 8 and not more than 20 carbon atoms, (4) ester compounds of a higher fatty acid having not less than 8 and not more than 22 carbon atoms and a polyhydric alcohol, or compounds produced by adding an alkyleneoxide to the ester compounds, (5) polyether-modified silicone-based surfactants, and the like.

The polyether-modified silicone-based surfactants have such a structure that a hydrocarbon group bonded to a side chain and/or a terminal end of a silicone oil is substituted with a polyether group. Examples of the suitable polyether group of the polyether-modified silicone-based surfactants include a polyethyleneoxy group, a polypropyleneoxy group and a polyalkyleneoxy group formed by addition-bonding an ethyleneoxy group and a propyleneoxy group (a trimethyleneoxy group or a propane-1,2-diyloxy group) to each other in a block form or in a random form. More specifically, as the polyether-modified silicone-based surfactants, there may be used a compound formed by grafting a polyether group to a main chain of a silicone, a compound formed by bonding a silicone and a polyether group to each other in a block form, etc.

Examples of commercially available products of the nonionic surfactant include "SURFYNOL" series products available from Air Products & Chemicals, Inc., such as "SURFYNOL 420", "SURFYNOL 440", "SURFYNOL 465" and "SURFYNOL 485"; "ACETYLENOL" series products available from Kawaken Fine Chemicals Co., Ltd., such as "ACETYLENOL E0O", "ACETYLENOL E13T", "ACETYLENOL E40", "ACETYLENOL E60", "ACETYLENOL E100" and "ACETYLENOL E200"; and an ethyleneoxide adduct of lauryl alcohol "EMULGEN 120" (average molar number of addition of ethyleneoxide: 12) available from Kao Corporation, etc.

The content of the surfactant in the liquid composition is preferably not less than 0.1% by mass, more preferably not less than 0.2% by mass and even more preferably not less than 0.3% by mass, and is also preferably not more than 5% by mass, more preferably not more than 3% by mass and even more preferably not more than 2.5% by mass.

In order to improve ejection stability of the liquid composition, applicability of the liquid composition to a print head or an ink cartridge, and storage stability and various other properties of the liquid composition, various additives that can be suitably used for the respective purposes may also be added to the liquid composition. Examples of the additives include a viscosity controller, an ultraviolet absorber, an antioxidant, an antiseptic agent, a mildew-proof agent, a pH controller, a dye dissolving aid, a defoaming agent, a metal chelating agent, etc.

<Properties of Liquid Composition>

The pH value of the liquid composition is preferably not less than 7, more preferably not less than 8 and even more preferably not less than 8.5, and is also preferably not more than 11, more preferably not more than 10 and even more preferably not more than 9.5.

The pH value of the liquid composition means the value measured at 20° C. using a pH meter (for example, "D-51" available from HORIBA Ltd., and the like).

The viscosity of the liquid composition is preferably not less than 1 mPa·s, more preferably not less than 1.5 mPa·s and even more preferably not less than 2 mPa·s, and is also preferably not more than 10 mPa·s, more preferably not more than 7 mPa s and even more preferably not more than 4 mPa·s.

The viscosity of the liquid composition may be measured using an E-type viscometer available from Toki Sangyo Co., Ltd., equipped with a standard rotor (1° 34'×R24) under the measuring conditions including a measuring temperature of 20° C. and a measuring time of 1 minute while controlling a rotating speed of the device to its maximum allowable rotating speed within the rotating speed range of 20 to 100 rpm in which the ink can be suitably used.

<Use and Applications of Liquid Composition>

The liquid composition is used for forming a protective film on an ejection energy generating element in a liquid ejection head of an ink-jet type.

Examples of use and applications of the liquid composition include use of the liquid composition for enhancing insulating properties of the ejection energy-generating element in the liquid ejection head of an ink-jet type against an ink.

Incidentally, the liquid ejection head may be mainly used in the form of a print head of an ink-jet type, and may also be applied to these liquid ejection heads used in the applications such as production of biochips or printing of electronic circuits. As the liquid ejection head, there may be mentioned not only the ink-jet print head, but also heads used, for example, for production of color filters, etc.

More specifically, the liquid composition may be used as a filling liquid or an ink, etc. In addition, the liquid composition may be used under such a condition that the liquid composition is kept in contact with members of the liquid ejection head.

Examples of the filling liquid include those filling liquids to be filled in the ink-jet print head. As the ink, there may also be mentioned an ink for ink-jet printing.

It is not necessary that the filling liquid contains the aforementioned colorant. However, if the filling liquid contains the colorant, after storing the liquid ejection head filled with the filling liquid for a predetermined period of time, the filling liquid may be ejected from the liquid ejection head.

Thus, the filling liquid can also be applied to the below-mentioned method of confirming the condition of the head.

The ink-jet type may be either a piezoelectric type or a thermal type.

The piezoelectric type head includes a piezoelectric element as the ejection energy-generating element, and the thermal type head includes an electro-thermal conversion element as the ejection energy-generating element.

The liquid ejection head of a piezoelectric type is equipped, for example, with a nozzle plate having an ejection port(s) for ejecting the liquid, and the ejection energy-generating element. In this case, the ejection energy-generating element includes a substrate formed with a pressure chamber, a first electrode formed on one surface of the substrate, a piezoelectric body formed on the first electrode, and a second electrode formed on the piezoelectric body.

The respective electrodes of the ejection energy-generating element are preferably formed of a metal, a conductive metal oxide or a conductive metal nitride, more preferably formed of a metal or a conductive metal oxide, and even more preferably formed of a metal.

Examples of the metal used for the electrodes include copper, aluminum, gold, platinum, silver, molybdenum, ruthenium, germanium, indium and strontium.

Examples of the conductive metal oxide used for the electrodes include indium tin oxide (ITO), $In_2O_3$, Sb—$In_2O_3$, Nb—$TiO_2$, ZnO, Al—ZnO, Ga—ZnO, indium gallium zinc composite oxide (IGZO), $RuO_2$, $IrO_2$, Nb-STO, $SrRuO_2$, $LaNiO_3$, $BaPbO_3$, $La_{2-x}Sr_xCoO_4$ (LSCO), $La_{1-x}Sr_xMnO_3$ (LSMO) and $YBa_2Cu_3O_7$ (YBCO).

Examples of the conductive metal nitride used for the electrodes include titanium nitride.

Examples of a material of the substrate include silicon, silicon oxide, stainless steel (SUS), yttrium-stabilized zirconia (YSZ), alumina, sapphire, SiC and $SrTiO_3$, etc. In addition, as the substrate, there may also be used a laminated substrate such as an SOI substrate, which is formed by laminating an $SiO_2$ film and an Si active layer sequentially on a silicon substrate. The piezoelectric body may be produced by the method of raising a temperature of the substrate to crystallize the material thereof during the film-forming process by a vapor phase epitaxial method. Examples of the material of the piezoelectric body include lead zirconate titanate (PZT), lead zirconate titanate (PZT) doped with Nb (niobium), etc.

[Ink-Jet Image-Forming Method]

In the ink-jet image-forming method of the present invention, the liquid composition is ejected from the liquid ejection head of an ink-jet type equipped with the ejection energy-generating element to form characters or images. The liquid composition is ejected from the liquid ejection head onto a printing medium. As the liquid ejection head, there may be used, for example, the below-mentioned print head 1. By forming the characters or images using the colorant-containing liquid composition, it is possible to obtain a printed material produced by printing the characters or images on the printing medium while preventing corrosion of the liquid ejection head.

[Method of Forming Protective Film on Liquid Ejection Head]

The method of forming a protective film on the liquid ejection head of an ink-jet type according to the present invention includes, for example, the step of applying a voltage to the ejection energy-generating element under such a condition that the ejection energy-generating element is allowed to contact with the liquid composition.

The voltage-applying step may be conducted, for example, by filling the liquid composition into the liquid ejection head, and then applying a voltage to the ejection energy-generating element to eject the liquid composition therefrom.

When thus applying a voltage to the ejection energy-generating element, the protective film is formed on the ejection energy-generating element in the liquid ejection head, so that the ejection energy-generating element can be enhanced in insulating properties against an ink. As a result, it is possible to suppress generation of oxygen and an acid produced by electrolysis of water, and thereby prevent corrosion of the liquid ejection head.

In the following, a print head 1 to which the method of forming a protective film according to the present invention can be applied is described in more detail by referring to the accompanying drawings. In the following description, a print head that includes an ink-jet head of a piezoelectric type is explained as the liquid ejection head.

FIG. 1 is a sectional view showing an example of a construction of the print head 1 according to a first embodiment of the present invention.

The print head 1 is equipped with an ink-jet head 10 and a nozzle plate 20.

The ink-jet head 10 includes a silicon substrate 11 in which a pressure chamber 13 is formed (hereinafter also referred to merely as an "Si substrate").

On the Si substrate 11, a metal oxide layer 14 and further a first electrode layer 16 are successively laminated. A piezoelectric body layer 17 is laminated on the first electrode layer 16, and a second electrode layer 18 is further laminated on the piezoelectric body layer 17. A part of a thickness portion of the Si substrate 11 still remains unremoved so as to function as a vibration plate 12.

In the ink-jet head 10, a surface of the Si substrate 11 opposed to its surface on which the piezoelectric body layer 17 is laminated, is bonded to the nozzle plate 20. The nozzle plate 20 is provided with an ejection port 21 for ejecting the liquid composition (ink).

Meanwhile, although not shown in FIG. 1, the Si substrate 11 is provided with an ink feed path (such as a common path, individual feed paths or the like) for feeding the liquid composition to the pressure chamber 13. In addition, although in FIG. 1, there is shown an example of the construction of the print head in which the nozzle plate 20 is directly bonded to a lower surface of the Si substrate 11, a flow path plate in which the other flow path structure is formed may be laminated between the Si substrate 11 and the nozzle plate 20.

The first electrode layer 16 and the second electrode layer 18 are respectively connected to ground terminals of a drive circuit 30 (drive IC) or drive voltage output terminals of the drive circuit 30. The drive circuit 30 serves for supplying a driving electric power (drive voltage) for deforming the piezoelectric body layer 17 interposed between the electrodes.

In FIG. 1, there are shown components of an ejection mechanism including one ejection port 21, one pressure chamber 13 communicated with the ejection port, and one ejection energy-generating element corresponding to the pressure chamber 13. However, the ink-jet head 10 may be provided with a plurality of ejection mechanisms (droplet-ejecting elements) having the same structure as shown herein.

The arrangement of a plurality of ejection ports 21 on the ejecting surface (nozzle surface) of the nozzle plate 20 is not particularly limited.

Examples of the arrangement of the ejection ports 21 include various nozzle arrangements such as a one dimensional arrangement in which a plurality of nozzles are arranged in a line, a staggered arrangement in which a plurality of nozzles are arranged in two rows, and a two dimensional arrangement in which 3 or more nozzle rows are arranged two-dimensionally in combination with each other.

In the ink-jet head 10, the metal oxide layer 14 is laminated on the Si substrate 11, and the first electrode layer 16 is further laminated on the metal oxide layer 14. Then, the piezoelectric body layer 17 is laminated on the first electrode layer 16, and the second electrode layer 18 is laminated on the piezoelectric body layer 17. Next, the Si substrate 11 is partially etched from its lower surface side to form the vibration plate 12 as a part of the Si substrate 11, so that the pressure chamber 13 is defined as an etched region thereof. As described above, the ink-jet head 10 is constructed in the form of an MEMS (Micro Electro Mechanical Systems) device having a laminated structure. The nozzle plate 20 is provided in a bottom portion of the ink-jet head 10 to thereby obtain the print head 1.

The liquid composition is filled from the ink feed path into the pressure chamber 13, and the vibration plate 12 is piezoelectrically actuated and undergoes flexing deformation, whereby the volume of the pressure chamber 13 is changed to cause the change in pressure within the pressure chamber, so that droplets of ink are ejected from the respective ejection ports 21. More specifically, the ink-jet head 10 operates as the ejection energy-generating element for generating energy for ejecting the liquid from the nozzles.

In the ink-jet head 10, since the metal oxide layer 14 and the vibration plate 12 are disposed between the liquid composition and the fist electrode layer 16, it is considered that the liquid composition and the fist electrode layer 16 are isolated from each other upon use. However, in the ink-jet head 10, the thickness of each of the first electrode layer 16, the metal oxide layer 14 and the vibration plate 12 has a large influence on a transmission rate of the pressure generated by the piezoelectric body layer 17, and it is therefore preferred that the thickness is smaller. Although the metal oxide layer 14 and the vibration plate 12 have insulating properties, these components tend to be adversely influenced by variation of thicknesses thereof when subjected to an etching step or a spattering step, if the thicknesses are small, and as a result, are likely to suffer from film defects. In addition, even though the components are free of film defects upon production of the print head, they tend to suffer from other new film defects by deformation of the print head owing to repeated driving operations thereof. In fact, in the case where the thicknesses of the metal oxide layer 14 and the vibration plate 12 were reduced while ensuring a good production rate thereof, the components were likely to suffer from film defects or variation of thicknesses thereof upon formation of the films, so that corrosion of the first electrode layer 16 owing to the film defects was caused.

On the other hand, it is considered that when the liquid composition of the present invention is filled in the print head, and a voltage is applied to the first electrode layer 16 and the second electrode layer 18, the compound 1 and the compound 2 contained in the composition serve for forming a protective film so as to compensate for the film defects caused in the metal oxide layer 14 and the vibration plate 12, so that it is possible to suppress corrosion of the print head owing to the electrode reaction from the first electrode layer 16.

Figure 2:
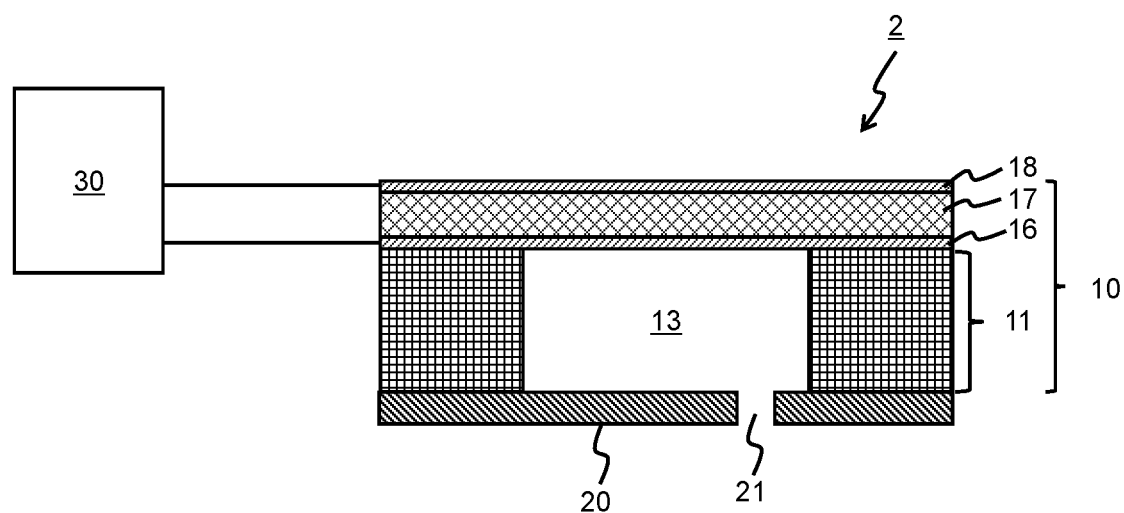
FIG. 2 is a sectional view showing an example of a construction of a print head 2 according to a second embodiment of the present invention.

FIG. 2 is a sectional view showing an example of a construction of the print head 2 according to a second embodiment of the present invention.

In FIG. 2, components identical or similar to those shown in FIG. 1 are denoted by the same reference numerals, and therefore detailed descriptions of these components are omitted herein.

The print head 2 includes none of the metal oxide layer 14 and the vibration plate 12 used in the print head 1 according to the first embodiment of the present invention, and the first electrode layer 16 is exposed to an inside of the pressure chamber 13. In the print head 2, the pressure generated by deformation of the piezoelectric body layer 17 can be transmitted at a high efficiency to the liquid composition. However, since no layer for insulation between the first electrode layer 16 and the liquid composition filled in the pressure chamber 13 is provided in the print head 2, it is considered that the corrosion of the print head owing to the electrode reaction from the first electrode layer 16 tends to be caused upon energization thereof.

On the other hand, it is considered that when the liquid composition of the present invention is filled in the print head, and a voltage is applied to the first electrode layer 16 and the second electrode layer 18, the compound 1 and the compound 2 contained in the composition serve for forming a protective film on a lower surface layer of the first electrode layer 16, so that it is possible to suppress corrosion of the print head owing to the electrode reaction from the first electrode layer 16.

[Method of Storing Print Head]

The method of storing a print head of an ink-jet type according to the present invention includes, for examples, the steps of:

applying a voltage to the ejection energy-generating element under such a condition that the ejection energy-generating element is allowed to contact with the aforementioned liquid composition; and filling the print head with an ink after the step of applying a voltage to the ejection energy-generating element.

By forming the protective film on the print head in the aforementioned voltage-applying step and then filling the ink in the print head, the print head can be stored while preventing the print head from contacting with outside air, so that it is possible to prolong a service life of the print head.

As the ink, there may be mentioned those inks used for ink-jet printing. From the viewpoint of well forming the protective film, preferred is an ink containing the aforementioned liquid composition.

The aforementioned storing method is preferably applied to an ink-jet printing apparatus for commercial printing purposes. In the commercial printing applications, the print heads are used repeatedly and therefore required to have high durability. By forming the protective film on the print head using the liquid composition of the present invention after the printing operation and then keeping the print head under maintenance works, it is possible to prolong a durable service life of the print head.

[Method of Confirming Condition of Head]

As the method of confirming the condition of the print head, there may be used the method of confirming the state of ejection of the liquid from the print head or the method of printing characters or images on a printing medium.

As the method of confirming the state of ejection of the liquid, there may be used the method of measuring the change in mass of the liquid ejected when ejecting the predetermined number of droplets of the liquid, the method of confirming whether or not the droplets of the liquid are ejected from each nozzle of the print head by optical observation or by using an optical sensor, or the like. As the method of printing characters or images on a printing medium, there may be used the method of printing a predetermined print chart on an ink-jet paper, etc., to observe presence or absence of droplets of the liquid impacted on the printing medium or turbulence of impaction of the droplets of the liquid on the printing medium, or the like.

With respect to the aforementioned embodiments, in the present specification, there are further described the following aspects relating to the liquid composition for ink-jet printing, the ink-jet image-forming method, the method of forming a protective film, the method of storing a liquid ejection head, the use of the liquid composition, and the like.

<1> A liquid composition for ink-jet printing, containing not less than 0.01% by mass and not more than 1.5% by mass of a compound represented by the following formula (1) or a salt thereof, not less than 0.05% by mass and not more than 35% by mass of a compound represented by the following formula (2), and water:

$$R^1\text{—O-(AO)}_j(CH_2CH_2O)_n\text{—B—COOH} \qquad (1),$$

wherein $R^1$ is a linear or branched aliphatic hydrocarbon group having not less than 2 and not more than 8 carbon atoms, or an alicyclic hydrocarbon group having not less than 3 and not more than 8 carbon atoms; AO is an alkyleneoxy group having 3 or 4 carbon atoms; B is an alkylene group having not less than 1 and not more than 3 carbon atoms; and j and n represent average molar numbers of addition of (AO) and ($CH_2CH_2O$), respectively, in which j is a number of not less than 0 and not more than 1, n is a number of not less than 5 and not more than 20, and when j is more than 0 (j>0), the groups of (AO) and ($CH_2CH_2O$) may be arranged in any order; and $$R^2\text{—O-(AO)}_k(CH_2CH_2O)_m\text{—H} \qquad (2),$$

wherein $R^2$ is a linear or branched aliphatic hydrocarbon group having not less than 2 and not more than 8 carbon atoms, or an alicyclic hydrocarbon group having not less than 3 and not more than 8 carbon atoms; AO is an alkyleneoxy group having 3 or 4 carbon atoms; and k and m represent average molar numbers of addition of (AO) and ($CH_2CH_2O$), respectively, in which k is a number of not less than 0 and not more than 1, m is a number of not less than 6 and not more than 21, and when k is more than 0 (k>0), the groups of (AO) and ($CH_2CH_2O$) may be arranged in any order.

<2> The liquid composition for ink-jet printing according to the aspect <1>, wherein a mass ratio of the compound represented by the aforementioned formula (1) to the compound represented by the aforementioned formula (2) [compound represented by the formula (1)/compound represented by the formula (2)] is preferably not less than 0.001, more preferably not less than 0.004, even more preferably not less than 0.01 and further even more preferably not less than 0.02, and is also preferably not more than 0.30, more preferably not more than 0.20, even more preferably not more than 0.15, further even more preferably not more than 0.10 and still further even more preferably not more than 0.05.

<3> The liquid composition for ink-jet printing according to the aspect <1> or <2>, wherein a total content of the compound represented by the aforementioned formula (1) and the compound represented by the aforementioned formula (2) in the liquid composition is preferably not less than 0.05% by mass, more preferably not less than 0.1% by mass, even more preferably not less than 0.2% by mass, further even more preferably not less than 1% by mass and still further even more preferably not less than 3% by mass, and is also preferably not more than 35% by mass, more preferably not more than 30% by mass, even more preferably not more than 20% by mass and further even more preferably not more than 10% by mass.

<4> The liquid composition for ink-jet printing according to any one of the aspects <1> to <3>, wherein n and m in the aforementioned formulae (1) and (2) preferably have the following relationship (A), more preferably the following relationship (A-1), even more preferably the following relationship (A-2) and further even more preferably the following relationship (A-3):

$$m-5 \le n \le m+5 \qquad (A);$$

$$m-1 \le n \le m+1 \qquad (A-1);$$

$$m-1 \le n \le m \qquad (A-2); \text{ and}$$

$$m-1 = n \qquad (A-3).$$

<5> The liquid composition for ink-jet printing according to any one of the aspects <1> to <4>, wherein a difference between the number of carbon atoms of $R^1$ and the number of carbon atoms of $R^2$ is not more than 2, and it is preferred that the number of carbon atoms of $R^1$ is identical to the number of carbon atoms of $R^2$.

<6> The liquid composition for ink-jet printing according to any one of the aspects <1> to <5>, wherein a content of water in the liquid composition is preferably not less than 30% by mass, more preferably not less than 40% by mass and even more preferably not less than 50% by mass, and is also preferably not more than 95% by mass and more preferably not more than 90% by mass.

<7> The liquid composition for ink-jet printing according to any one of the aspects <1> to <6>, wherein a pH value of the liquid composition is preferably not less than 7, more preferably not less than 8 and even more preferably not less than 8.5, and is also preferably not more than 11, more preferably not more than 10 and even more preferably not more than 9.5.

<8> The liquid composition for ink-jet printing according to any one of the aspects <1> to <7>, further containing a colorant.

<9> The liquid composition for ink-jet printing according to the aspect <8>, wherein the colorant is in the form of polymer particles containing the colorant and a polymer.

<10> The liquid composition for ink-jet printing according to the aspect <8> or <9>, wherein a content of the colorant in the liquid composition is preferably not less than 1% by mass, more preferably not less than 2% by mass and even more preferably not less than 3% by mass, and is also preferably not more than 30% by mass, more preferably not more than 20% by mass and even more preferably not more than 10% by mass.

<11> The liquid composition for ink-jet printing according to any one of the aspects <1> to <10>, further containing an organic solvent, preferably at least one organic solvent selected from the group consisting of glycol ethers other than the compound 2, polyhydric alcohols, monohydric alcohols, alkyl ethers of these alcohols, nitrogen-containing heterocyclic compounds, amides, amines and sulfur-containing compounds, and more preferably at least one organic solvent selected from the group consisting of the aforementioned glycol ethers, polyhydric alcohols and nitrogen-containing heterocyclic compounds.

<12> The liquid composition for ink-jet printing according to any one of the aspects <1> to <11>, wherein a content of the organic solvent in the liquid composition is preferably not less than 5% by mass, more preferably not less than 8% by mass and even more preferably not less than 10% by mass, and is also preferably not more than 60% by mass, more preferably not more than 50% by mass, even more preferably not more than 40% by mass and further even more preferably not more than 30% by mass.

<13> A use of the liquid composition according to any one of the aspects <1> to <12> as a filling liquid or an ink.

<14> A use of the liquid composition according to any one of the aspects <1> to <12> for enhancing insulating properties of an ejection energy-generating element in a liquid ejection head of an ink-jet type against an ink.

<15> An ink-jet image-forming method including the step of ejecting the liquid composition for ink-jet printing according to any one of the aspects <1> to <12> from a liquid ejection head of an ink-jet type including an ejection energy-generating element to form characters or images.

<16> A method of forming a protective film on a liquid ejection head of an ink-jet type including an ejection energy-generating element, including the step of applying a voltage to the ejection energy-generating element under such a condition that the ejection energy-generating element, preferably a piezoelectric element or an electro-thermal conversion element, is allowed to contact with the liquid composition according to any one of the aspects <1> to <12>.

<17> The method of forming a protective film according to the aspect <16>, wherein the ejection energy-generating element includes a metal electrode or a conductive metal oxide electrode.

<18> The method of forming a protective film according to the aspect <16> or <17>, wherein the liquid ejection head includes a nozzle plate including ejection ports for ejecting a liquid, and the ejection energy-generating element;

the ejection energy-generating element includes a substrate in which a pressure chamber is formed, a first electrode formed on one surface of the substrate, a piezoelectric body formed on the first electrode, and a second electrode formed on the piezoelectric body; and the step of applying a voltage is the step of applying a voltage to the ejection energy-generating element under such a condition that the pressure chamber is filled with the liquid composition.

<19> A method of storing a liquid ejection head of an ink-jet type including an ejection energy-generating element, including the steps of:

applying a voltage to the ejection energy-generating element under such a condition that the ejection energy-generating element is allowed to contact with the liquid composition according to any one of the aspects <1> to <12>; and filling the liquid ejection head with an ink after the step of applying a voltage to the ejection energy-generating element.

EXAMPLES

In the following Production Examples, Examples and Comparative Examples, the "part(s)" and "%" indicate "part(s) by mass" and "% by mass", respectively, unless otherwise specified.

Meanwhile, various properties were measured by the following methods.

[Method of Measuring Various Properties]

[Acid Value of Polymer]

The acid value of the polymer was measured by the same method as prescribed in JIS K0070: 1992 except that methyl ethyl ketone was used in place of a mixed solvent containing ethanol and ether.

[Measurement of Weight-Average Molecular Weight of Polymer]

The weight-average molecular weight of the polymer was measured by gel permeation chromatography (hereinafter also referred to merely as "GPC") under the following conditions using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using polystyrenes as a reference standard substance.

GPC apparatus: "HLC-8120GPC" available from Tosoh Corporation

Columns: "TSK-GEL, α-M"×2 available from Tosoh Corporation

Flow rate: 1 mL/min

[Measurement of Solid Content of Dispersion Liquid]

Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

[Surface Tension of Liquid Composition]

Using a surface tension meter "CBVP-Z" available from Kyowa Interface Science Co., Ltd., a platinum plate was dipped in 5 g of the liquid composition filled in a cylindrical polyethylene container (3.6 cm in diameter×1.2 cm in depth), and the static surface tension of the liquid composition thus filled was measured at 20° C. by the surface tension meter.

[Volume-Average Particle Size of Colorant Particles (Pigment Particles) in Dispersion Liquid]

The dispersion liquid of the colorant particles (pigment particles) was diluted with ion-exchanged water that had been previously subjected to filtration treatment using a 0.2 μm-mesh filter. The particle sizes of the particles in the thus diluted dispersion were measured at 25° C. using a laser particle analyzing system "ELSZ-1000" available from Otsuka Electrics Co., Ltd.

Production of Polymer

Production Example P1: Polymer Solution P-1

The components shown in the column "Initial Mixture" in Table 1 were charged into a reaction vessel equipped with two dropping funnels 1 and 2 and mixed with each other, and an inside atmosphere of the reaction vessel was replaced with nitrogen gas, thereby obtaining an initial mixture.

On the other hand, the components shown in the respective columns "Dropping Mixture 1" and "Dropping Mixture 2" in Table 1 were mixed with each other to thereby prepare a dropping mixture 1 and a dropping mixture 2, respectively. The thus prepared dropping mixtures 1 and 2 were charged into the dropping funnels 1 and 2, respectively, and an inside atmosphere of the respective dropping funnels 1 and 2 was replaced with nitrogen gas.

In a nitrogen atmosphere, the initially charged monomer solution in the reaction vessel was maintained at 75° C. while stirring, and the dropping mixture 1 in the dropping funnel 1 was gradually added dropwise into the reaction vessel over 3 hours. Then, the dropping mixture 2 in the dropping funnel 2 was gradually added dropwise into the reaction vessel over 2 hours. After completion of the dropwise addition of the dropping mixtures 1 and 2, the resulting mixed solution in the reaction vessel was stirred at 75° C. for 2 hours. Next, a polymerization initiator solution prepared by dissolving 1.5 parts of polymerization initiator 2,2'-azobis(2,4-dimethylvaleronitrile) "V-65" available from Wako Pure Chemical Industries, Ltd., in 10 parts of methyl ethyl ketone (MEK) was added to the mixed solution, and the resulting reaction solution was aged at 75° C. for 1 hour while stirring. The aforementioned procedure including the preparation and addition of the polymerization initiator solution and the aging of the reaction solution was repeated two more times. Then, the reaction solution in the reaction vessel was maintained at 85° C. for 2 hours, thereby obtaining a polymer solution P-1. A part of the resulting polymer was dried to measure an acid value and a weigh-average molecular weight of the polymer.

The solid content of the polymer was measured, and the polymer was diluted with MEK until the solid content of the polymer reached 50%.

charged with a predetermined amount of the polymer shown in Table 2. While stirring the polymer in the disper at 1400 rpm, a predetermined amount of methyl ethyl ketone (MEK) as shown in Table 2 was added to the polymer, and then ion-exchanged water and a 5N (16.9% by mass) sodium hydroxide aqueous solution were further added thereto. The resulting reaction solution was stirred at 1400 rpm for 15 minutes while cooling the reaction solution in a water bath at 0° C. After stirring the reaction solution, a predetermined amount of a carbon black "Nipex 160" available from Degussa AG as shown in Table 2 was added to the reaction solution, and the resulting solution was stirred at 6000 rpm for 3 hours. The thus obtained mixture was then subjected to dispersion treatment by passing the mixture through a Microfluidizer "M-140K" available from Microfluidics Corporation under a pressure of 180 MPa, 20 times.

<Step (2)>

Then, using a rotary evaporator "N-1000S" available from Tokyo Rikakikai Co., Ltd., the resulting dispersion was maintained in a warm bath adjusted to 40° C. under a pressure of 0.02 MPa for 2 hours to remove the organic solvent therefrom. The obtained reaction solution was further maintained in the warm bath adjusted to 62° C. for 4 hours under the pressure reduced to 0.01 MPa to remove the organic solvent and a part of water therefrom, thereby controlling a concentration of the pigment in the resulting reaction solution to 23% to 25%. Then, a concentration of the pigment were measured, and the concentration of the pigment in the reaction solution was controlled to 20% using

TABLE 1

|  |  |  | Production Examples P1 Polymer Solution P-1 Mixtures | | |
|---|---|---|---|---|---|
|  |  |  | Initial mixture (part(s) by mass) | Dropping mixture 1 (part(s) by mass) | Dropping mixture 2 (part(s) by mass) |
| Components added (part(s) by mass) | Monomers | Methacrylic acid | 0 | 320 | 80 |
|  |  | NK ESTER EH4E*[1] | 60 | 480 | 60 |
|  |  | Benzyl acrylate | 80 | 640 | 80 |
|  |  | Styrene macromer*[2] | 40 | 360 | 0 |
|  | Solvent | MEK*[3] | 0 | 1200 | 490 |
|  | Polymerization initiator | V-65*[4] | 0 | 16 | 4 |
|  | Chain transfer agent | 2-Mercaptoethanol | 0.6 | 4.2 | 1.2 |
| Properties | Acid value (mgKOH/g) |  |  | 130 |  |
|  | Weight-average molecular weight Mw |  |  | 80,000 |  |

*[1]NK ESTER EH4E: 2-Ethylhexy polyethylene glycol monomethacrylate (average molar number of addition of ethyleneoxide: 4; end group: 2-ethylhexyl group) "NK ESTER EH4E" available from Shin-Nakamura Chemical Co., Ltd.
*[2]Styrene macromer: "AS-6S" (number-average molecular weight: 6000; segment: styrene-acrylonitrile; toluene solution; solid content: 51%) available from Toagosei Co., Ltd.
*[3]MEK: Methyl ethyl ketone
*[4]V-65: 2,2'-Azobis(2,4-dimethylvaleronitrile) "V-65" available from Wako Pure Chemical Industries, Ltd.

Production of Pigment Water-Based Dispersion Liquids

Production Examples PD1 to PD4 <Production of Pigment Water-Based Dispersion Liquids PD-1 to PD-4>

<Step (1)>

A 2 L-container disper "T.K. ROBOMIX" (equipped with "HOMODISPER 2.5 Model" as a stirring device; blade diameter: 40 mm) available from Primix Corporation was ion-exchanged water. Next, the resulting reaction mixture was filtered through 5 μm-mesh and 1.2 μm-mesh membrane filters "Minisart" available from Sartorius Inc., in sequential order, thereby obtaining a pigment water-based dispersion liquid PD-1.

The same procedure as described above for production of the pigment water-based dispersion liquid PD-1 was repeated except that the pigment used therein was replaced with the respective pigments shown in Table 2, thereby obtaining pigment water-based dispersion liquids PD-2 to PD-4.

TABLE 2

|  |  |  |  | Production Examples | | | |
|---|---|---|---|---|---|---|---|
|  |  |  |  | PD1 | PD2 | PD3 | PD4 |
|  | Pigment water-based dispersion liquids | | | PD-1 | PD-2 | PD-3 | PD-4 |
| Step (1) | Composition of polymer solution | Polymer solution | Kind of polymer solution | P-1 | P-1 | P-1 | P-1 |
|  | (part(s) by mass) | | Amount of solution | 85.7 | 85.7 | 85.7 | 85.7 |
|  |  | | Methyl ethyl ketone | 93 | 93 | 93 | 93 |
|  |  | | 5N sodium hydroxide aqueous solution | 23.6 | 23.6 | 23.6 | 23.6 |
|  |  | | 25% Ammonia aqueous solution | 20.3 | 20.3 | 20.3 | 20.3 |
|  |  | | Ion-exchanged water | 419.8 | 419.8 | 419.8 | 419.8 |
|  | Pigment (part(s) by mass) | | Nipex 160 | 100 | — | — | — |
|  |  | | CFR6111T | — | 100 | — | — |
|  |  | | CFB6338JC | — | — | 100 | — |
|  |  | | KOY-01 | — | — | — | 100 |
|  | Ratio of pigment to polymer (pigment/polymer) | | | 70/30 | 70/30 | 70/30 | 70/30 |
|  | Properties of pigment dispersion liquid | Concentration of pigment (% by mass) | | 20.0 | 20.0 | 20.0 | 20.0 |
|  |  | Volume-average particle size (nm) | | 120 | 120 | 95 | 130 |

Nipex160: Carbon black "Nipex160" available from Orion Engineered Carbons SA
CFR6111T: Magenta pigment "CFR6111T" available from Dainichiseika Color & Chemicals Mfg. Co., Ltd.
CFB6338JC: Cyan pigment "CFB6338JC" available from Dainichiseika Color & Chemicals Mfg. Co., Ltd.
KOY-01: Yellow pigment "KOY-01" available from Dainichiseika Color & Chemicals Mfg. Co., Ltd.

Production Example X1 <Production of Self-Dispersible Carbon Dispersion Liquid X-1>

While stirring 1000 g of a self-dispersible carbon black dispersion liquid "SENSIJET BLACK SDP100" (solid content: 15%) available from Sensient Technologies Corporation with a stirrer, 19.3 g of a 1N sodium hydroxide aqueous solution was added dropwise thereinto at a rate of 1 g/sec. Next, using a rotary evaporator "N-1000S" available from Tokyo Rikakikai Co., Ltd., the obtained dispersion was maintained in a warm bath adjusted to 62° C. for 4 hours under the pressure reduced to 0.01 MPa to remove a part of water therefrom, thereby controlling a concentration of the pigment in the resulting dispersion to 23% to 25%.

Then, the total concentration of the pigment in the dispersion was measured, and the concentration of the pigment in the dispersion was controlled to 20% using ion-exchanged water. Next, the obtained dispersion was filtered through 5 μm-mesh and 1.2 μm-mesh membrane filters "Minisart" available from Sartorius Inc., in sequential order, thereby obtaining a self-dispersible carbon dispersion liquid X-1.

Production of Compound 1

Production Example A1 <Method for Production of Compound 1-1>

A 300 mL five-necked flask equipped with a reflux tube, a dissolved oxygen densitometer "InPro 6850i/12/220" available from METTLER TOLEDO Inc., and a mechanical stirrer "TEFLON (registered trademark) Crescent-Shaped Stirring Blade" (75 mm in width×20 mm in height×4 mm in thickness) available from ASONE Corporation, was charged with 100 g of a compound 2-1 (an ethyleneoxide adduct of hexyl alcohol (average molar number of addition of ethyleneoxide: 10.0)) as a raw material available from DKS Co., Ltd., and further charged with 5% Pt-1% Bi/C (Lot. TP-2/0230) as a catalyst available from Evonik Industries AG and ion-exchanged water such that the amount of the catalyst added was 5 parts on the basis of 100 parts of the raw material, and the ratio of water to the raw material (water:raw material) was 80.9:19.1.

The raw material, catalyst and water charged into the aforementioned five-necked flask were heated to 70° C. under a nitrogen flow while stirring with a mechanical stirrer at 400 rpm, and after reaching 70° C., nitrogen was continuously flowed through the flask for 15 minutes. Thereafter, the nitrogen flow was changed to an oxygen flow, and oxygen was flowed through the flask at a rate of 90 mL/min for 18 hours to react the contents of the flask, thereby obtaining a compound 1-1 (n-Hex-O—$(CH_2CH_2O)_9$—$CH_2COOH$:polyethylene glycol alkyl ether acetic acid).

After completion of the reaction, the resulting reaction solution was rapidly subjected to pressure filtration at 70° C. to separate the catalyst therefrom. Incidentally, the pressure filtration was carried out such that the reaction solution (70° C.) obtained after completion of the reaction was flowed into a filtering device previously heated to 70° C. while feeding nitrogen thereinto at a rate of 4 $kgf/cm^2$ under pressure.

The resulting polyethylene glycol alkyl ether acetic acid was subjected to $^1$H-NMR analysis to integrate a proton peak of the carbon atom adjacent to a carboxy group of the compound. The thus obtained integrated value was divided by an ideal integrated value calculated assuming that a whole amount of a polyethylene glycol alkyl ether as a raw material was converted into the polyethylene glycol alkyl ether acetic acid, to thereby determine a yield of the polyethylene glycol alkyl ether acetic acid. As a result, the yield of the polyethylene glycol alkyl ether acetic acid was 99%. For convenience, the amounts of the respective components formulated hereinlater were determined assuming that the aforementioned yield was 100% as an apparent yield.

Production Examples A2 to A11 <Method for Production of Compounds 1-2 to 1-6 and Compounds 1c-1 to 1c-5>

The same procedure as in Production Example A1 was repeated except that the raw material used was replaced with the respective compounds 2 as the raw materials shown in Table 3, thereby obtaining compounds 1-2 to 1-6 and Compound 1c-1 to 1c-5. The yield of the respective compounds thus obtained was 99%, and for convenience, the amounts of the respective components formulated hereinlater were determined assuming that the aforementioned yield was 100% as an apparent yield.

TABLE 3

|  |  | Production Examples | | | | | |
|---|---|---|---|---|---|---|---|
|  |  | A1 | A2 | A3 | A4 | A5 | A6 |
| Raw material: compound 2 | Compound 1 | 1-1 | 1-2 | 1-3 | 1-4 | 1-5 | 1-6 |
|  | Kind | 2-1 | 2-2 | 2-3 | 2-4 | 2-5 | 2-6 |
|  | Number of carbon atoms in $R^2$ in formula (2) | 6 | 2 | 4 | 8 | 6 | 6 |
|  | m (numeral value) in formula (2) | 10 | 10 | 10 | 10 | 6 | 20 |
| Product | Number of carbon atoms in $R^1$ in formula (1) | 6 | 2 | 4 | 8 | 6 | 6 |
|  | n (numeral value) in formula (1) | 9 | 9 | 9 | 9 | 5 | 19 |

|  |  | Production Examples | | | | |
|---|---|---|---|---|---|---|
|  |  | A7 | A8 | A9 | A10 | A11 |
| Raw material: compound 2 | Compound 1 | 1c-1 | 1c-2 | 1c-3 | 1c-4 | 1c-5 |
|  | Kind | 2c-1 | 2c-2 | 2c-3 | 2c-4 | 2c-5 |
|  | Number of carbon atoms in $R^2$ in formula (2) | 1 | 10 | 6 | 6 | 12 |
|  | m (numeral value) in formula (2) | 10 | 10 | 5 | 30 | 7 |
| Product | Number of carbon atoms in $R^1$ in formula (1) | 1 | 10 | 6 | 6 | 12 |
|  | n (numeral value) in formula (1) | 9 | 9 | 4 | 29 | 6 |

The details of the compounds 1 and the compounds 2 shown in Table 3 are as follows.

Compound 1-1: n-Hex-O—$(CH_2CH_2O)_9$—$CH_2COOH$
Compound 1-2: $CH_3CH_2$—O—$(CH_2CH_2O)_9$—$CH_2COOH$
Compound 1-3: n-Bu-O—$(CH_2CH_2O)_9$—$CH_2COOH$
Compound 1-4: n-Oct-O—$(CH_2CH_2O)_9$—$CH_2COOH$
Compound 1-5: n-Hex-O—$(CH_2CH_2O)_5$—$CH_2COOH$
Compound 1-6: n-Hex-O—$(CH_2CH_2O)_{19}$—$CH_2COOH$
Compound 1c-1: $CH_3$—O—$(CH_2CH_2O)_9$—$CH_2COOH$
Compound 1c-2: n-Dec-O—$(CH_2CH_2O)_9$—$CH_2COOH$
Compound 1c-3: n-Hex-O—$(CH_2CH_2O)_4$—$CH_2COOH$
Compound 1c-4: n-Hex-O—$(CH_2CH_2O)_{29}$—$CH_2COOH$
Compound 1c-5: n-Dod-O—$(CH_2CH_2O)_6$—$CH_2COOH$
Compound 2-1: n-Hex-O—$(CH_2CH_2O)_{10}$—H available from DKS Co., Ltd.
Compound 2-2: $CH_3CH_2$—O—$(CH_2CH_2O)_{10}$—H available from DKS Co., Ltd.
Compound 2-3: n-Bu-O—$(CH_2CH_2O)_{10}$—H available from DKS Co., Ltd.
Compound 2-4: n-Oct-O—$(CH_2CH_2O)_{10}$—H available from DKS Co., Ltd.
Compound 2-5: n-Hex-O—$(CH_2CH_2O)_6$—H available from DKS Co., Ltd.
Compound 2-6: n-Hex-O—$(CH_2CH_2O)_{20}$—H available from DKS Co., Ltd.
Compound 2c-1: $CH_3$—O—$(CH_2CH_2O)_{10}$—H available from DKS Co., Ltd.
Compound 2c-2: n-Dec-O—$(CH_2CH_2O)_{10}$—H available from DKS Co., Ltd.
Compound 2c-3: n-Hex-O—$(CH_2CH_2O)_5$—H available from DKS Co., Ltd.
Compound 2c-4: n-Hex-O—$(CH_2CH_2O)_{30}$—H available from DKS Co., Ltd.
Compound 2c-5: n-Dod-O—$(CH_2CH_2O)_7$—H available from DKS Co., Ltd.

In the aforementioned formulae, "n-Hex" is an n-hexyl group; "n-Bu" is an n-butyl group; "n-Oct" is an n-octyl group; "n-Dec" is an n-decyl group; "n-Dod" is an n-dodecyl group; and the respective numeral values suffixed to $(CH_2CH_2O)$ represent an average molar number of addition of $(CH_2CH_2O)$ groups.

Production of Liquid Compositions (Containing No Colorant)

Examples B1 to B14 and Comparative Examples B1 to B10 <Production of Liquid Compositions B-1 to B-14 and B-51 to B-60>

The compound 1, the compound 2, triethylene glycol (reagent) available from Tokyo Chemical Industry Co., Ltd., propylene glycol (reagent) available from Tokyo Chemical Industry Co., Ltd., 1,2-hexanediol (reagent) available from Tokyo Chemical Industry Co., Ltd., triethylene glycol monobutyl ether (reagent) available from Tokyo Chemical Industry Co., Ltd., a mildew-proof agent "Ploxel LVS" (1,2-benzisothiazol-3(2H)-one; active ingredient content: 20%) available from Arch Chemicals Japan Inc., a surfactant "SURFYNOL 420" (an ethyleneoxide (1.3) adduct of acetylenediol) available from Nissin Chemical Co., Ltd., a surfactant "SURFYNOL 460" (an ethyleneoxide (10) adduct of acetylenediol) available from Nissin Chemical Co., Ltd., a 5 mol/L sodium hydroxide aqueous solution (reagent) available from Tokyo Chemical Industry Co., Ltd., and ion-exchanged water as shown in Table 4 were added and mixed with each other. The resulting mixed solution was filtered through a 0.45 μm-mesh membrane filter "Minisart" available from Sartorius Inc., thereby obtaining liquid compositions B-1 to B-14 according to the respective Examples as well as liquid compositions B-51 to B-60 according to the respective Comparative Examples. The pH value of the respective liquid compositions thus obtained was 8 as measured at 20° C.

TABLE 4

| Components (part(s) by mass) | | | Example B1 | Example B2 | Example B3 | Example B4 | Example B5 |
|---|---|---|---|---|---|---|---|
| | | Liquid Composition | B-1 | B-2 | B-3 | B-4 | B-5 |
| | Compound 1 | Kind | 1-1 | 1-1 | 1-1 | 1-1 | 1-1 |
| | | Number of carbon atoms in $R^1$ in formula (1) | 6 | 6 | 6 | 6 | 6 |
| | | n (numeral value) in formula (1) | 9 | 9 | 9 | 9 | 9 |
| | | Amount | 0.125 | 1.000 | 0.125 | 0.050 | 0.020 |
| | Compound 2 | Kind | 2-1 | 2-1 | 2-1 | 2-1 | 2-1 |
| | | Number of carbon atoms in $R^2$ in formula (2) | 6 | 6 | 6 | 6 | 6 |
| | | m (numeral value) in formula (2) | 10 | 10 | 10 | 10 | 10 |
| | | Amount | 5 | 5 | 30 | 5 | 5 |
| | Organic solvent | Triethylene glycol | 10 | 10 | 10 | 10 | 10 |
| | | Propylene glycol | 10 | 10 | 10 | 10 | 10 |
| | | 1,2-Hexanediol | 3 | 3 | 3 | 3 | 3 |
| | | TEGmBE | 3 | 3 | 3 | 3 | 3 |
| | Antiseptic agent | Ploxel LVS | 0.1 | 0.1 | 0.1 | 0.1 | 0.1 |
| | Surfactant | SURFYNOL 420 | 0.5 | 0.5 | 0.5 | 0.5 | 0.5 |
| | | SURFYNOL 465 | 0.5 | 0.5 | 0.5 | 0.5 | 0.5 |
| | Basic substance | 5 N NaOH aqueous solution | 0.05 | 0.43 | 0.05 | 0.02 | 0.01 |
| | | Water | 68 | 66 | 43 | 68 | 68 |
| | pH of liquid composition | | 8 | 8 | 8 | 8 | 8 |

| Components (part(s) by mass) | | | Example B6 | Example B7 | Example B8 | Example B9 | Example B10 |
|---|---|---|---|---|---|---|---|
| | | Liquid Composition | B-6 | B-7 | B-8 | B-9 | B-10 |
| | Compound 1 | Kind | 1-1 | 1-1 | 1-2 | 1-3 | 1-4 |
| | | Number of carbon atoms in $R^1$ in formula (1) | 6 | 6 | 2 | 4 | 8 |
| | | n (numeral value) in formula (1) | 9 | 9 | 9 | 9 | 9 |
| | | Amount | 0.125 | 0.125 | 0.125 | 0.125 | 0.125 |
| | Compound 2 | Kind | 2-1 | 2-1 | 2-2 | 2-3 | 2-4 |
| | | Number of carbon atoms in $R^2$ in formula (2) | 6 | 6 | 2 | 4 | 8 |
| | | m (numeral value) in formula (2) | 10 | 10 | 10 | 10 | 10 |
| | | Amount | 0.2 | 0.08 | 5 | 5 | 5 |
| | Organic solvent | Triethylene glycol | 10 | 10 | 10 | 10 | 10 |
| | | Propylene glycol | 10 | 10 | 10 | 10 | 10 |
| | | 1,2-Hexanediol | 3 | 3 | 3 | 3 | 3 |
| | | TEGmBE | 3 | 3 | 3 | 3 | 3 |
| | Antiseptic agent | Ploxel LVS | 0.1 | 0.1 | 0.1 | 0.1 | 0.1 |
| | Surfactant | SURFYNOL 420 | 0.5 | 0.5 | 0.5 | 0.5 | 0.5 |
| | | SURFYNOL 465 | 0.5 | 0.5 | 0.5 | 0.5 | 0.5 |
| | Basic substance | 5N NaOH aqueous solution | 0.05 | 0.05 | 0.06 | 0.06 | 0.05 |
| | | Water | 73 | 73 | 68 | 68 | 68 |
| | pH of liquid composition | | 8 | 8 | 8 | 8 | 8 |

| Components (part(s) by mass) | | | Example B11 | Example B12 | Example B13 | Example B14 |
|---|---|---|---|---|---|---|
| | | Liquid Composition | B-11 | B-12 | B-13 | B-14 |
| | Compound 1 | Kind | 1-5 | 1-6 | 1-1 | 1-6 |
| | | Number of carbon atoms in $R^1$ in formula (1) | 6 | 6 | 6 | 6 |
| | | n (numeral value) in formula (1) | 5 | 19 | 9 | 19 |
| | | Amount | 0.125 | 0.125 | 0.125 | 0.125 |
| | Compound 2 | Kind | 2-5 | 2-6 | 2-6 | 2-1 |
| | | Number of carbon atoms in $R^2$ in formula (2) | 6 | 6 | 6 | 6 |
| | | m (numeral value) in formula (2) | 6 | 20 | 20 | 10 |
| | | Amount | 5 | 5 | 5 | 5 |

TABLE 4-continued

|  |  |  | | | | |
|---|---|---|---|---|---|---|
|  | Organic solvent | Triethylene glycol | 10 | 10 | 10 | 10 |
|  |  | Propylene glycol | 10 | 10 | 10 | 10 |
|  |  | 1,2-Hexanediol | 3 | 3 | 3 | 3 |
|  |  | TEGmBE | 3 | 3 | 3 | 3 |
|  | Antiseptic agent | Ploxel LVS | 0.1 | 0.1 | 0.1 | 0.1 |
|  | Surfactant | SURFYNOL 420 | 0.5 | 0.5 | 0.5 | 0.5 |
|  |  | SURFYNOL 465 | 0.5 | 0.5 | 0.5 | 0.5 |
|  | Basic substance | 5N NaOH aqueous solution | 0.08 | 0.03 | 0.05 | 0.03 |
|  |  | Water | 68 | 68 | 68 | 68 |
|  |  | pH of liquid composition | 8 | 8 | 8 | 8 |

|  |  |  | Examples and Comparative Examples | | | | |
|---|---|---|---|---|---|---|---|
|  |  |  | Comparative Example B1 | Comparative Example B2 | Comparative Example B3 | Comparative Example B4 | Comparative Example B5 |
|  |  | Liquid Composition | B-51 | B-52 | B-53 | B-54 | B-55 |
| Components (part(s) by mass) | Compound 1 | Kind | 1-1 | 1-1 | 1-1 | 1-1 | 1-1 |
|  |  | Number of carbon atoms in $R^1$ in formula (1) | 6 | 6 | 6 | 6 | 1 |
|  |  | n (numeral value) in formula (1) | 9 | 9 | 9 | 9 | 9 |
|  |  | Amount | 0.005 | 0.125 | 2.000 | 0.125 | 0.125 |
|  | Compound 2 | Kind | 2-1 | 2-1 | 2-1 | 2-1 | 2c-1 |
|  |  | Number of carbon atoms in $R^2$ in formula (2) | 6 | 6 | 6 | 6 | 1 |
|  |  | m (numeral value) in formula (2) | 10 | 10 | 10 | 10 | 10 |
|  |  | Amount | 5 | 0.02 | 5 | 40 | 5 |
|  | Organic solvent | Triethylene glycol | 10 | 10 | 10 | 10 | 10 |
|  |  | Propylene glycol | 10 | 10 | 10 | 10 | 10 |
|  |  | 1,2-Hexanediol | 3 | 3 | 3 | 3 | 3 |
|  |  | TEGmBE | 3 | 3 | 3 | 3 | 3 |
|  | Antiseptic agent | Ploxel LVS | 0.1 | 0.1 | 0.1 | 0.1 | 0.1 |
|  | Surfactant | SURFYNOL 420 | 0.5 | 0.5 | 0.5 | 0.5 | 0.5 |
|  |  | SURFYNOL 465 | 0.5 | 0.5 | 0.5 | 0.5 | 0.5 |
|  | Basic substance | 5N NaOH aqueous solution | — | 0.05 | 0.87 | 0.05 | 0.06 |
|  |  | Water | 68 | 73 | 65 | 33 | 68 |
|  |  | pH of liquid composition | 8 | 8 | 8 | 8 | 8 |

|  |  |  | Examples and Comparative Examples | | | | |
|---|---|---|---|---|---|---|---|
|  |  |  | Comparative Example B6 | Comparative Example B7 | Comparative Example B8 | Comparative Example B9 | Comparative Example B10 |
|  |  | Liquid Composition | B-56 | B-57 | B-58 | B-59 | B-60 |
| Components (part(s) by mass) | Compound 1 | Kind | 1c-2 | 1c-3 | 1c-4 | 1c-5 | — |
|  |  | Number of carbon atoms in $R^1$ in formula (1) | 10 | 6 | 6 | 12 | — |
|  |  | n (numeral value) in formula (1) | 9 | 4 | 29 | 6 | — |
|  |  | Amount | 0.125 | 0.125 | 0.125 | 0.125 | — |
|  | Compound 2 | Kind | 2c-2 | 2c-3 | 2c-4 | — | 2c-6 |
|  |  | Number of carbon atoms in $R^2$ in formula (2) | 10 | 6 | 6 | — | 2EH |
|  |  | m (numeral value) in formula (2) | 10 | 5 | 30 | — | 4 |
|  |  | Amount | 5 | 5 | 5 | — | 5 |
|  | Organic solvent | Triethylene glycol | 10 | 10 | 10 | 10 | 10 |
|  |  | Propylene glycol | 10 | 10 | 10 | 10 | 10 |
|  |  | 1,2-Hexanediol | 3 | 3 | 3 | 3 | 3 |
|  |  | TEGmBE | 3 | 3 | 3 | 3 | 3 |
|  | Antiseptic agent | Ploxel LVS | 0.1 | 0.1 | 0.1 | 0.1 | 0.1 |
|  | Surfactant | SURFYNOL 420 | 0.5 | 0.5 | 0.5 | 0.5 | 0.5 |
|  |  | SURFYNOL 465 | 0.5 | 0.5 | 0.5 | 0.5 | 0.5 |
|  | Basic substance | 5N NaOH aqueous solution | 0.05 | 0.09 | 0.02 | 0.06 | — |
|  |  | Water | 68 | 68 | 68 | 73 | 68 |
|  |  | pH of liquid composition | 8 | 8 | 8 | 8 | 8 |

The details of the compounds 1, the compounds 2 and the abbreviations shown in Table 4 have the same meanings as those described in Table 3, or are as follows.

Compound 2c-6: 2-EH-O—$(CH_2CH_2O)_4$—H available from DKS Co., Ltd.

TEGmBE: Triethylene glycol monobutyl ether

In the aforementioned formula, "2-EH" is a 2-ethylhexyl group. Incidentally, the numeral value suffixed to $(CH_2CH_2O)$ represents an average molar number of addition of the $(CH_2CH_2O)$ groups.

Production of Liquid Compositions (Containing Colorant)

Examples C1 to C20 and Comparative Examples C1 to C10 <Production of Liquid Compositions C-1 to C-20 and Liquid Compositions C-51 to C-60>

The predetermined amounts of the respective pigment water-based dispersion liquids PD-1 to PD-4 and/or the self-dispersible carbon dispersion liquid X-1, or the black dye "PRO-JET FAST BLACK 2" available from FUJIFILM IMAGING COLORANTS Ltd., as shown in Table 5, as well as the compound 1, the compound 2, triethylene glycol (reagent) available from Wako Pure Chemical Industries, Ltd., propylene glycol (reagent) available from Wako Pure Chemical Industries, Ltd., 1,2-hexanediol (reagent) available from Tokyo Chemical Industry Co., Ltd., triethylene glycol monobutyl ether (reagent) available from Wako Pure Chemical Industries, Ltd., a mildew-proof agent "Ploxel LVS" (1,2-benzisothiazol-3(2H)-one; active ingredient content: 20%) available from Arch Chemicals Japan Inc., a surfactant "SURFYNOL 420" (an ethyleneoxide (1.3) adduct of acetylenediol) available from Nissin Chemical Co., Ltd., a surfactant "SURFYNOL 460" (an ethyleneoxide (10) adduct of acetylenediol) available from Nissin Chemical Co., Ltd., a 5 mol/L sodium hydroxide aqueous solution (reagent) available from Wako Pure Chemical Industries, Ltd., and ion-exchanged water as shown in Table 5 were added and mixed with each other. The resulting mixed solution was filtered through a 0.45 μm-mesh membrane filter "Minisart" available from Sartorius Inc., thereby obtaining liquid compositions C-1 to C-20 as well as liquid compositions C-51 to C-60. The pH value of the respective liquid compositions thus obtained was 9 as measured at 20° C.

TABLE 5

| | | | Examples and Comparative Examples | | | | |
|---|---|---|---|---|---|---|---|
| | | | Example C1 | Example C2 | Example C3 | Example C4 | Example C5 |
| | Liquid Compositions | | C-1 | C-2 | C-3 | C-4 | C-5 |
| Components (part(s) by mass) | Colorant | Self-dispersible carbon dispersion liquid X-1 | 25 | — | 12.5 | — | — |
| | | Pigment water-based dispersion liquid PD-1 | — | 25 | 12.5 | — | — |
| | | Pigment water-based dispersion liquid PD-2 | — | — | — | 25 | — |
| | | Pigment water-based dispersion liquid PD-3 | — | — | — | — | 25 |
| | | Pigment water-based dispersion liquid PD-4 | — | — | — | — | — |
| | | PRO-JET FAST BLACK 2 | — | — | — | — | — |
| | Compound 1 | Kind | 1-1 | 1-1 | 1-1 | 1-1 | 1-1 |
| | | Number of carbon atoms in $R^1$ in formula (1) | 6 | 6 | 6 | 6 | 6 |
| | | n (numeral value) in formula (1) | 9 | 9 | 9 | 9 | 9 |
| | | Amount | 0.125 | 0.125 | 0.125 | 0.125 | 0.125 |

| | | | Examples and Comparative Examples | | | | |
|---|---|---|---|---|---|---|---|
| | | | Example C1 | Example C2 | Example C3 | Example C4 | Example C5 |
| Components (part(s) by mass) | Compound 2 | Kind | 2-1 | 2-1 | 2-1 | 2-1 | 2-1 |
| | | Number of carbon atoms in $R^2$ in formula (2) | 6 | 6 | 6 | 6 | 6 |
| | | m (numeral value) in formula (2) | 10 | 10 | 10 | 10 | 10 |
| | | Amount | 5 | 5 | 5 | 5 | 5 |
| | Organic solvent | Triethylene glycol | 10 | 10 | 10 | 10 | 10 |
| | | Propylene glycol | 10 | 10 | 10 | 10 | 10 |
| | | 1,2-Hexanediol | 3 | 3 | 3 | 3 | 3 |
| | | TEGmBE | 3 | 3 | 3 | 3 | 3 |
| | Antiseptic agent | Ploxel LVS | 0.1 | 0.1 | 0.1 | 0.1 | 0.1 |
| | Surfactant | SURFYNOL 420 | 0.5 | 0.5 | 0.5 | 0.5 | 0.5 |
| | | SURFYNOL 465 | 0.5 | 0.5 | 0.5 | 0.5 | 0.5 |
| | Basic substance | 5N NaOH aqueous solution | 0.05 | 0.05 | 0.05 | 0.05 | 0.05 |
| | | Water | 42.72 | 42.72 | 42.72 | 42.72 | 42.72 |
| | pH of liquid composition | | 9 | 9 | 9 | 9 | 9 |

TABLE 5-continued

| | | | Examples and Comparative Examples | | | | |
|---|---|---|---|---|---|---|---|
| | | | Example C6 | Example C7 | Example C8 | Example C9 | Example C10 |
| | | Liquid Compositions | C-6 | C-7 | C-8 | C-9 | C-10 |
| Components (part(s) by mass) | Colorant | Self-dispersible carbon dispersion liquid X-1 | — | — | 12.5 | 12.5 | 12.5 |
| | | Pigment water-based dispersion liquid PD-1 | — | — | 12.5 | 12.5 | 12.5 |
| | | Pigment water-based dispersion liquid PD-2 | — | — | — | — | — |
| | | Pigment water-based dispersion liquid PD-3 | — | — | — | — | — |
| | | Pigment water-based dispersion liquid PD-4 | 25 | — | — | — | — |
| | | PRO-JET FAST BLACK 2 | — | 3 | — | — | — |
| | Compound 1 | Kind | 1-1 | 1-1 | 1-1 | 1-1 | 1-1 |
| | | Number of carbon atoms in $R^1$ in formula (1) | 6 | 6 | 6 | 6 | 6 |
| | | n (numeral value) in formula (1) | 9 | 9 | 9 | 9 | 9 |
| | | Amount | 0.125 | 0.125 | 1.000 | 0.125 | 0.050 |

| | | | Examples and Comparative Examples | | | | |
|---|---|---|---|---|---|---|---|
| | | | Example C6 | Example C7 | Example C8 | Example C9 | Example C10 |
| Components (part(s) by mass) | Compound 2 | Kind | 2-1 | 2-1 | 2-1 | 2-1 | 2-1 |
| | | Number of carbon atoms in $R^2$ in formula (2) | 6 | 6 | 6 | 6 | 6 |
| | | m (numeral value) in formula (2) | 10 | 10 | 10 | 10 | 10 |
| | | Amount | 5 | 5 | 5 | 30 | 5 |
| | Organic solvent | Triethylene glycol | 10 | 10 | 10 | 10 | 10 |
| | | Propylene glycol | 10 | 10 | 10 | 10 | 10 |
| | | 1,2-Hexanediol | 3 | 3 | 3 | 3 | 3 |
| | | TEGmBE | 3 | 3 | 3 | 3 | 3 |
| | Antiseptic agent | Ploxel LVS | 0.1 | 0.1 | 0.1 | 0.1 | 0.1 |
| | Surfactant | SURFYNOL 420 | 0.5 | 0.5 | 0.5 | 0.5 | 0.5 |
| | | SURFYNOL 465 | 0.5 | 0.5 | 0.5 | 0.5 | 0.5 |
| | Basic substance | 5N NaOH aqueous solution | 0.05 | 0.05 | 0.43 | 0.05 | 0.02 |
| | | Water | 42.72 | 64.72 | 41.47 | 17.72 | 42.83 |
| | | pH of liquid composition | 9 | 9 | 9 | 9 | 9 |

| | | | Examples and Comparative Examples | | | | |
|---|---|---|---|---|---|---|---|
| | | | Example C11 | Example C12 | Example C13 | Example C14 | Example C15 |
| | | Liquid Compositions | C-11 | C-12 | C-13 | C-14 | C-15 |
| Components (part(s) by mass) | Colorant | Self-dispersible carbon dispersion liquid X-1 | 12.5 | 12.5 | 12.5 | 12.5 | 12.5 |
| | | Pigment water-based dispersion liquid PD-1 | 12.5 | 12.5 | 12.5 | 12.5 | 12.5 |
| | | Pigment water-based dispersion liquid PD-2 | — | — | — | — | — |
| | | Pigment water-based dispersion liquid PD-3 | — | — | — | — | — |
| | | Pigment water-based dispersion liquid PD-4 | — | — | — | — | — |
| | | PRO-JET FAST BLACK 2 | — | — | — | — | — |
| | Compound 1 | Kind | 1-1 | 1-1 | 1-1 | 1-2 | 1-3 |
| | | Number of carbon atoms in $R^1$ in formula (1) | 6 | 6 | 6 | 2 | 4 |
| | | n (numeral value) in formula (1) | 9 | 9 | 9 | 9 | 9 |
| | | Amount | 0.020 | 0.125 | 0.125 | 0.125 | 0.125 |

| | | | Examples and Comparative Examples | | | | |
|---|---|---|---|---|---|---|---|
| | | | Example C11 | Example C12 | Example C13 | Example C14 | Example C15 |
| Components (part(s) by mass) | Compound 2 | Kind | 2-1 | 2-1 | 2-1 | 2-2 | 2-3 |
| | | Number of carbon atoms in $R^2$ in formula (2) | 6 | 6 | 6 | 2 | 4 |
| | | m (numeral value) in formula (2) | 10 | 10 | 10 | 10 | 10 |
| | | Amount | 5 | 0.2 | 0.08 | 5 | 5 |

TABLE 5-continued

| | | | | | | | |
|---|---|---|---|---|---|---|---|
| Organic solvent | Triethylene glycol | 10 | 10 | 10 | 10 | 10 |
| | Propylene glycol | 10 | 10 | 10 | 10 | 10 |
| | 1,2-Hexanediol | 3 | 3 | 3 | 3 | 3 |
| | TEGmBE | 3 | 3 | 3 | 3 | 3 |
| Antiseptic agent | Ploxel LVS | 0.1 | 0.1 | 0.1 | 0.1 | 0.1 |
| Surfactant | SURFYNOL 420 | 0.5 | 0.5 | 0.5 | 0.5 | 0.5 |
| | SURFYNOL 465 | 0.5 | 0.5 | 0.5 | 0.5 | 0.5 |
| Basic substance | 5N NaOH aqueous solution | 0.01 | 0.05 | 0.05 | 0.06 | 0.06 |
| | Water | 42.87 | 47.52 | 47.64 | 42.71 | 42.72 |
| | pH of liquid composition | 9 | 9 | 9 | 9 | 9 |

| | | | Examples and Comparative Examples | | | | |
|---|---|---|---|---|---|---|---|
| | | | Example C16 | Example C17 | Example C18 | Example C19 | Example C20 |
| | Liquid Composition | | C-16 | C-17 | C-18 | C-19 | C-20 |
| Components (part(s) by mass) | Colorant | Self-dispersible carbon dispersion liquid X-1 | 12.5 | 12.5 | 12.5 | 12.5 | 12.5 |
| | | Pigment water-based dispersion liquid PD-1 | 12.5 | 12.5 | 12.5 | 12.5 | 12.5 |
| | | Pigment water-based dispersion liquid PD-2 | — | — | — | — | — |
| | | Pigment water-based dispersion liquid PD-3 | — | — | — | — | — |
| | | Pigment water-based dispersion liquid PD-4 | — | — | — | — | — |
| | | PRO-JET FAST BLACK 2 | — | — | — | — | — |
| | Compound 1 | Kind | 1-4 | 1-5 | 1-6 | 1-1 | 1-6 |
| | | Number of carbon atoms in $R^1$ in formula (1) | 8 | 6 | 6 | 6 | 6 |
| | | n (numeral value) in formula (1) | 9 | 5 | 19 | 9 | 19 |
| | | Amount | 0.125 | 0.125 | 0.125 | 0.125 | 0.125 |

| | | | Examples and Comparative Examples | | | | |
|---|---|---|---|---|---|---|---|
| | | | Example C16 | Example C17 | Example C18 | Example C19 | Example C20 |
| Components (part(s) by mass) | Compound 2 | Kind | 2-4 | 2-5 | 2-6 | 2-6 | 2-1 |
| | | Number of carbon atoms in $R^2$ in formula (2) | 8 | 6 | 6 | 6 | 6 |
| | | m (numeral value) in formula (2) | 10 | 6 | 20 | 20 | 10 |
| | | Amount | 5 | 5 | 5 | 5 | 5 |
| | Organic solvent | Triethylene glycol | 10 | 10 | 10 | 10 | 10 |
| | | Propylene glycol | 10 | 10 | 10 | 10 | 10 |
| | | 1,2-Hexanediol | 3 | 3 | 3 | 3 | 3 |
| | | TEGmBE | 3 | 3 | 3 | 3 | 3 |
| | Antiseptic agent | Ploxel LVS | 0.1 | 0.1 | 0.1 | 0.1 | 0.1 |
| | Surfactant | SURFYNOL 420 | 0.5 | 0.5 | 0.5 | 0.5 | 0.5 |
| | | SURFYNOL 465 | 0.5 | 0.5 | 0.5 | 0.5 | 0.5 |
| | Basic substance | 5N NaOH aqueous solution | 0.05 | 0.08 | 0.03 | 0.05 | 0.03 |
| | | Water | 42.72 | 42.69 | 42.75 | 42.72 | 42.75 |
| | | pH of liquid composition | 9 | 9 | 9 | 9 | 9 |

| | | | Examples and Comparative Examples | | | | |
|---|---|---|---|---|---|---|---|
| | | | Comparative Example C1 | Comparative Example C2 | Comparative Example C3 | Comparative Example C4 | Comparative Example C5 |
| | Liquid Composition | | C-51 | C-52 | C-53 | C-54 | C-55 |
| Components (part(s) by mass) | Colorant | Self-dispersible carbon dispersion liquid X-1 | 12.5 | 12.5 | 12.5 | 12.5 | 12.5 |
| | | Pigment water-based dispersion liquid PD-1 | 12.5 | 12.5 | 12.5 | 12.5 | 12.5 |
| | | Pigment water-based dispersion liquid PD-2 | — | — | — | — | — |
| | | Pigment water-based dispersion liquid PD-3 | — | — | — | — | — |
| | | Pigment water-based dispersion liquid PD-4 | — | — | — | — | — |
| | | PRO-JET FAST BLACK 2 | — | — | — | — | — |

TABLE 5-continued

|  |  |  |  |  |  |  |  |
|---|---|---|---|---|---|---|---|
|  | Compound 1 | Kind | 1-1 | 1-1 | 1-1 | 1-1 | 1c-1 |
|  |  | Number of carbon atoms in $R^1$ in formula (1) | 6 | 6 | 6 | 6 | 1 |
|  |  | n (numeral value) in formula (1) | 9 | 9 | 9 | 9 | 9 |
|  |  | Amount | 0.005 | 0.125 | 2.000 | 0.125 | 0.125 |

|  |  |  | Examples and Comparative Examples ||||| 
|---|---|---|---|---|---|---|---|
|  |  |  | Comparative Example C1 | Comparative Example C2 | Comparative Example C3 | Comparative Example C4 | Comparative Example C5 |
| Components (part(s) by mass) | Compound 2 | Kind | 2-1 | 2-1 | 2-1 | 2-1 | 2c-1 |
|  |  | Number of carbon atoms in $R^2$ in formula (2) | 6 | 6 | 6 | 6 | 1 |
|  |  | m (numeral value) in formula (2) | 10 | 10 | 10 | 10 | 10 |
|  |  | Amount | 5 | 0.02 | 5 | 40 | 5 |
|  | Organic solvent | Triethylene glycol | 10 | 10 | 10 | 10 | 10 |
|  |  | Propylene glycol | 10 | 10 | 10 | 10 | 10 |
|  |  | 1,2-Hexanediol | 3 | 3 | 3 | 3 | 3 |
|  |  | TEGmBE | 3 | 3 | 3 | 3 | 3 |
|  | Antiseptic agent | Ploxel LVS | 0.1 | 0.1 | 0.1 | 0.1 | 0.1 |
|  | Surfactant | SURFYNOL 420 | 0.5 | 0.5 | 0.5 | 0.5 | 0.5 |
|  |  | SURFYNOL 465 | 0.5 | 0.5 | 0.5 | 0.5 | 0.5 |
|  | Basic substance | 5N NaOH aqueous solution |  | 0.05 | 0.87 | 0.05 | 0.06 |
|  |  | Water | 42.90 | 47.70 | 40.03 | 7.72 | 42.71 |
|  | pH of liquid composition |  | 9 | 9 | 9 | 9 | 9 |

|  |  |  | Examples and Comparative Examples ||||| 
|---|---|---|---|---|---|---|---|
|  |  |  | Comparative Example C6 | Comparative Example C7 | Comparative Example C8 | Comparative Example C9 | Comparative Example C10 |
|  | Liquid Composition |  | C-56 | C-57 | C-58 | C-59 | C-60 |
| Components (part(s) by mass) | Colorant | Self-dispersible carbon dispersion liquid X-1 | 12.5 | 12.5 | 12.5 | 12.5 | 12.5 |
|  |  | Pigment water-based dispersion liquid PD-1 | 12.5 | 12.5 | 12.5 | 12.5 | 12.5 |
|  |  | Pigment water-based dispersion liquid PD-2 | — | — | — | — | — |
|  |  | Pigment water-based dispersion liquid PD-3 | — | — | — | — | — |
|  |  | Pigment water-based dispersion liquid PD-4 | — | — | — | — | — |
|  |  | PRO-JET FAST BLACK 2 | — | — | — | — | — |
|  | Compound 1 | Kind | 1c-2 | 1c-3 | 1c-4 | 1c-5 | — |
|  |  | Number of carbon atoms in $R^1$ in formula (1) | 10 | 6 | 6 | 12 | — |
|  |  | n (numeral value) in formula (1) | 9 | 4 | 29 | 6 | — |
|  |  | Amount | 0.125 | 0.125 | 0.125 | 0.125 | — |

|  |  |  | Examples and Comparative Examples ||||| 
|---|---|---|---|---|---|---|---|
|  |  |  | Comparative Example C6 | Comparative Example C7 | Comparative Example C8 | Comparative Example C9 | Comparative Example C10 |
| Components (part(s) by mass) | Compound 2 | Kind | 2c-2 | 2c-3 | 2c-4 | — | 2c-6 |
|  |  | Number of carbon atoms in $R^2$ in formula (2) | 10 | 6 | 6 | — | 2EH |
|  |  | m (numeral value) in formula (2) | 10 | 5 | 30 | — | 4 |
|  |  | Amount | 5 | 5 | 5 | — | 5 |
|  | Organic solvent | Triethylene glycol | 10 | 10 | 10 | 10 | 10 |
|  |  | Propylene glycol | 10 | 10 | 10 | 10 | 10 |
|  |  | 1,2-Hexanediol | 3 | 3 | 3 | 3 | 3 |
|  |  | TEGmBE | 3 | 3 | 3 | 3 | 3 |
|  | Antiseptic agent | Ploxel LVS | 0.1 | 0.1 | 0.1 | 0.1 | 0.1 |
|  | Surfactant | SURFYNOL 420 | 0.5 | 0.5 | 0.5 | 0.5 | 0.5 |
|  |  | SURFYNOL 465 | 0.5 | 0.5 | 0.5 | 0.5 | 0.5 |
|  | Basic substance | 5N NaOH aqueous solution | 0.05 | 0.09 | 0.02 | 0.06 |  |
|  |  | Water | 42.73 | 42.68 | 42.75 | 47.72 | 42.90 |
|  | pH of liquid composition |  | 9 | 9 | 9 | 9 | 9 |

The details of the compounds 1, the compounds 2 and the abbreviations shown in Table 5 have the same meanings as those described in Tables 3 and 4, Formation of Protective Films Examples BA1 to BA14 and Comparative Examples BA1 to BA10

<Measurement of Energization through Copper Wire and Amount of Electric Current Flowed Therethrough>

A copper wiring formed of a copper foil wire having a thickness of 0.018 mm and a width of 0.05 mm was produced on a flexible printed board to prepare an anode, whereas a spiral-shaped platinum electrode "TCE-2" available from TOYO TECHNICA Co., Ltd., and an Ag/AgCl reference electrode "TRE-8" available from TOYO TECHNICA Co., Ltd., were prepared as a cathode and a reference electrode, respectively. The respective liquid compositions shown in Table 6 were weighed in an amount of 100 g and charged into a 200 mL-capacity glass beaker, and further 10 g of a 2 mol/L sodium sulfate aqueous solution previously prepared was added thereto, and the contents of the glass beaker were uniformly mixed with each other.

Then, the copper wiring on the anode side was dipped 10 mm in the resulting mixed liquid, and "TCE-2" on the cathode side was dipped in the liquid such that a whole part of the spiral-shaped portion thereof was immersed in the liquid, and further the reference electrode was also dipped in the liquid. The anode and the cathode were vertically immersed in the liquid in the beaker and fixed therein such that a minimum distance between the anode and the cathode was 20 mm. The reference electrode was also fixed in the liquid in the beaker at the position at which a minimum distance from both of the anode and the cathode to the reference electrode was 15 mm.

Next, a working electrode terminal (WE) and a potential measuring terminal (SE) of a potentiostat "Versa STAT 4" available from TOYO TECHNICA Co., Ltd., were connected to an upper edge portion of the anode, a reference electrode terminal (RE) of the potentiostat was connected to an upper edge portion of the reference electrode, and an auxiliary electrode terminal (CE) of the potentiostat was connected to an upper edge portion of the cathode.

Selecting the cyclic voltammetry from an action menu for the working electrode terminal of the "Versa STAT 4", the energization measurement was conducted by setting an initial potential, a reversal potential and an end potential to 0 V, 5 V and 5 V, respectively, on the basis of the reference electrode, setting a reversal retention time to 0.1 second, and setting a potential sweep rate to 0.01 V/sec.

As a result of the energization, a copper wire BA-1 on a surface of which a protective film was formed was obtained.

Among the electric current values thus measured, those electric current values measured for the reversal retention time of 0.1 second were calculated to record an average value thereof. Examples BA2 to BA14 and Comparative Examples BA1 to BA10 were conducted by the same method as described above except that the liquid composition used was replaced with the respective liquid compositions as shown in Table 6 to form a protective film on each copper wire, thereby obtaining copper wires BA-1 to BA-14 and BA-51 to BA-60 on a surface of each of which the protective film was formed upon energization therethrough.

In each of the aforementioned Examples and Comparative Examples, a fresh anode was used, and the anodes used in the aforementioned Examples and Comparative Examples were each washed with ion-exchanged water, dewatered and then dried at an ordinary temperature so as to use them in the corresponding Examples BB1 to BB14 and Comparative Examples BB1 to BB10.

The electric current values obtained in the aforementioned energization measurement are shown in Table 6 as amounts of the electric current flowed through the respective copper wires.

The lower electric current value means that a protective film having higher insulating properties is formed on a liquid ejection head, so that the resulting liquid ejection head can be prevented from suffering from corrosion.

Evaluation

Reference Example R1 <Production of Standard Black Ink R-1 for Evaluation>

A standard black ink R-1 was produced by mixing 12.5 parts of the self-dispersible carbon dispersion liquid X-1, 12.5 parts of the pigment dispersion PD-1, 10 parts of triethylene glycol, 10 parts of propylene glycol, 3 parts of 1,2-hexanediol, 3 parts of triethylene glycol monobutyl ether, 0.1 part of "Ploxel LVS", 0.5 part of "SURFYNOL 420", 0.5 part of "SURFYNOL 465" and 47.9 parts of water.

<Measurement of Amount of Electric Current Flowed Through Copper Wire Using Ink>

Using the aforementioned respective copper wires BA-1 to BA-14 and BA-51 to BA-60, the standard black ink R-1 was weighed in an amount of 100 g and charged into a fresh 200 mL-capacity glass beaker. Using the anode used for the evaluation in Example B1, the copper wiring was dipped 10 mm in the liquid, and "TCE-2" on the cathode side was dipped in the liquid such that a whole part of the spiral-shaped portion thereof was immersed in the liquid, and further the reference electrode was also dipped in the liquid. The anode and the cathode were vertically immersed in the liquid in the beaker and fixed therein such that a minimum distance between the anode and the cathode was 20 mm. The reference electrode was also fixed in the liquid in the beaker at the position at which a minimum distance from both of the anode and the cathode to the reference electrode was 15 mm.

Next, a working electrode terminal (WE) and a potential measuring terminal (SE) of a potentiostat "Versa STAT 4" available from TOYO TECHNICA Co., Ltd., were connected to an upper edge portion of the anode, a reference electrode terminal (RE) of the potentiostat was connected to an upper edge portion of the reference electrode, and an auxiliary electrode terminal (CE) of the potentiostat was connected to an upper edge portion of the cathode.

Selecting the cyclic voltammetry from an action menu for the working electrode terminal of the "Versa STAT 4", the energization measurement was conducted by setting an initial potential, a reversal potential and an end potential to 0 V, 5 V and 5 V, respectively, on the basis of the reference electrode, setting a reversal retention time to 0.1 second, and setting a potential sweep rate to 0.01 V/sec.

Among the electric current values thus measured, those electric current values measured for the reversal retention time of 0.1 second were calculated to record an average value thereof.

This value was used for evaluating the degree of loss of insulating properties of the respective protective films formed on the copper wires BA-1 to BA-14 and BA-51 to BA-60 when the respective protective films were dipped in the ink containing no additives (standard black ink R-1) and suffered from breaking upon the energization. More specifically, it was indicated that in the practical applications, by filling the liquid composition in the head and previously applying a voltage thereto to form a protective film on the electrodes in the head, the effect of suppressing corrosion of the electrodes by the protective film could be continuously maintained even after replacing the liquid composition with an ordinary ink-jet ink.

TABLE 6

| | | | Examples and Comparative Examples | | | | |
|---|---|---|---|---|---|---|---|
| | | | Example BA1 | Example BA2 | Example BA3 | Example BA4 | Example BA5 |
| Compositions | Copper wires | | BA-1 | BA-2 | BA-3 | BA-4 | BA-5 |
| | Liquid compositions | Kind | B-1 | B-2 | B-3 | B-4 | B-5 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| Evaluation | Amount of electric current flowed through copper wire (μA) | | 35 | 45 | 45 | 40 | 50 |
| | Amount of electric current flowed through copper wire after treated with ink R-1 (μA) | | 35 | 60 | 60 | 65 | 75 |

| | | | Examples and Comparative Examples | | | | |
|---|---|---|---|---|---|---|---|
| | | | Example BA6 | Example BA7 | Example BA8 | Example BA9 | Example BA10 |
| Compositions | Copper wires | | BA-6 | BA-7 | BA-8 | BA-9 | BA-10 |
| | Liquid compositions | Kind | B-6 | B-7 | B-8 | B-9 | B-10 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| Evaluation | Amount of electric current flowed through copper wire (μA) | | 40 | 50 | 45 | 40 | 70 |
| | Amount of electric current flowed through copper wire after treated with ink R-1 (μA) | | 65 | 75 | 60 | 40 | 85 |

| | | | Examples and Comparative Examples | | | |
|---|---|---|---|---|---|---|
| | | | Example BA11 | Example BA12 | Example BA13 | Example BA14 |
| Compositions | Copper wires | | BA-11 | BA-12 | BA-13 | BA-14 |
| | Liquid compositions | Kind | B-11 | B-12 | B-13 | B-14 |
| | | Amount (part(s) by mass) | 100 | 100 | 100 | 100 |
| | 2-mol/L Sodium sulfate aqueous solution (part(s) by mass) | | 10 | 10 | 10 | 10 |
| Evaluation | Amount of electric current flowed through copper wire (μA) | | 50 | 50 | 70 | 70 |
| | Amount of electric current flowed through copper wire after treated with ink R-1 (μA) | | 65 | 65 | 90 | 90 |

| | | | Examples and Comparative Examples | | | | |
|---|---|---|---|---|---|---|---|
| | | | Comparative Example BA1 | Comparative Example BA2 | Comparative Example BA3 | Comparative Example BA4 | Comparative Example BA5 |
| Compositions | Copper wires | | BA-51 | BA-52 | BA-53 | BA-54 | BA-55 |
| | Liquid compositions | Kind | B-51 | B-52 | B-53 | B-54 | B-55 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| Evaluation | Amount of electric current flowed through copper wire (μA) | | 1500 | 1700 | 450 | 400 | 300 |
| | Amount of electric current flowed through copper wire after treated with ink R-1 (μA) | | 1500 | 1700 | 900 | 800 | 1500 |

TABLE 6-continued

| | | Comparative Example BA6 | Comparative Example BA7 | Comparative Example BA8 | Comparative Example BA9 | Comparative Example BA10 |
|---|---|---|---|---|---|---|
| | Copper wires | BA-56 | BA-57 | BA-58 | BA-59 | BA-60 |
| Compositions | Liquid Kind | B-56 | B-57 | B-58 | B-59 | B-60 |
| | compositions Amount (part(s) by mass) | 100 | 100 | 100 | 100 | 100 |
| | 2-mol/L Sodium sulfate aqueous solution (part(s) by mass) | 10 | 10 | 10 | 10 | 10 |
| Evaluation | Amount of electric current flowed through copper wire (μA) | 250 | 400 | 800 | 1900 | 2000 |
| | Amount of electric current flowed through copper wire after treated with ink R-1 (μA) | 1600 | 1200 | 1300 | 1500 | 1500 |

Formation of Protective Films

Examples BB1 to BB14 and Comparative Examples BB1 to BB10

<Production of Aluminum Anode 1>

An aluminum plate having a width of 3 cm, a length of 6 cm and a thickness of 0.5 mm was surface-polished with a buff, and then subjected to ultrasonic cleaning for 10 minutes in a cleaning bath formed by a 200 mL glass beaker filled with 100 g of a detergent "MAGICLEAN (registered trademark)" available from Kao Corporation, and further subjected to rinsing with ion-exchanged water. Next, a working electrode terminal (WE) and a potential measuring terminal (SE) of a potentiostat "Versa STAT 4" available from TOYO TECHNICA Co., Ltd., were connected to an upper edge portion of the aluminum plate, a reference electrode terminal (RE) of the potentiostat was connected to an upper edge portion of the reference electrode, and an auxiliary electrode terminal (CE) of the potentiostat was connected to an upper edge portion of a platinum cathode "TCE-2" available from TOYO TECHNICA Co., Ltd.

Then, a 200 mL-capacity glass beaker was charged with 100 g of a 2 mol/L sodium sulfate aqueous solution previously prepared.

Next, the aluminum plate on the anode side was dipped in the liquid in the beaker such that the portion of the aluminum plate having a width of 3 cm and a thickness of 0.5 mm was immersed in the liquid by 4 cm in its length from a tip end thereof, and "TCE-2" on the cathode side was dipped in the liquid such that a whole part of the spiral-shaped portion thereof was immersed in the liquid, and further the reference electrode was also dipped in the liquid. The anode and the cathode were vertically immersed in the liquid in the beaker and fixed therein such that a minimum distance between the anode and the cathode was 20 mm. The reference electrode was also fixed in the liquid in the beaker at the position at which a minimum distance from both of the anode and the cathode to the reference electrode was 15 mm.

Selecting the cyclic voltammetry from an action menu for the working electrode terminal of the "Versa STAT 4", the energization measurement was conducted by setting an initial potential, a reversal potential and an end potential to 0 V, −5 V and −5 V, respectively, on the basis of the reference electrode, setting a reversal retention time to 0.1 second, and setting a potential sweep rate to 0.01 V/sec.

Next, the aluminum plate was taken out of the liquid in the beaker, sufficiently rinsed with ion-exchanged water, and then covered with an insulating tape such that the portion of the aluminum plate extending 2 cm in length from an edge of the immersed side thereof was exposed, and the aluminum plate thus covered with the insulating tape was used as an anode. By conducting the aforementioned procedure, the aluminum plate was prepared as an anode in which a surface oxide film as well as stains or dirt were removed from the portion having a width of 3 cm, a length of 2 cm and a thickness of 0.5 mm.

<Measurement of Energization through Aluminum Plate and Amount of Electric Current Flowed Therethrough>

The aforementioned aluminum anode 1 was used as an anode for the measurement, whereas a spiral-shaped platinum electrode "TCE-2" available from TOYO TECHNICA Co., Ltd., and an Ag/AgCl reference electrode "TRE-8" available from TOYO TECHNICA Co., Ltd., were prepared as a cathode and a reference electrode, respectively.

The respective liquid compositions shown in Table 7 were weighed in an amount of 100 g and charged into a 200 mL-capacity glass beaker, and further 10 g of a 2 mol/L sodium sulfate aqueous solution previously prepared was added thereto, followed by adding 1 g of a 1.65% sodium chloride aqueous solution to the glass beaker, and the contents of the glass beaker were uniformly mixed with each other.

Next, the aluminum plate on the anode side was dipped in the liquid in the beaker such that the portion of the aluminum plate having a width of 3 cm and a thickness of 0.5 mm was immersed in the liquid by 2 cm in its length from a tip end thereof, and "TCE-2" on the cathode side was dipped in the liquid such that a whole part of the spiral-shaped portion thereof was immersed in the liquid, and further the reference electrode was also dipped in the liquid. The anode and the cathode were vertically immersed in the liquid in the beaker and fixed therein such that a minimum distance between the anode and the cathode was 20 mm. The reference electrode was also fixed in the liquid in the beaker at the position at which a minimum distance from both of the anode and the cathode to the reference electrode was 15 mm.

Next, a working electrode terminal (WE) and a potential measuring terminal (SE) of a potentiostat "Versa STAT 4" available from TOYO TECHNICA Co., Ltd., were connected to an upper edge portion of the anode, a reference electrode terminal (RE) of the potentiostat was connected to an upper edge portion of the reference electrode, and an auxiliary electrode terminal (CE) of the potentiostat was connected to an upper edge portion of the cathode.

Selecting the cyclic voltammetry from an action menu for the working electrode terminal of the "Versa STAT 4", an initial potential, a reversal potential upon voltage rise (0 V to 5 V), a reversal potential upon voltage drop (5 V to 0 V), and an end potential were set to 0 V, 5 V, 0 V and 5 V, respectively, on the basis of the reference electrode, a reversal retention time was set to 0.1 second, and a potential sweep rate was set to 0.01 V/sec. The procedure including the voltage rise and voltage drop was repeated 9 times, and the voltage was increased again to 5 V to record an average value of electric current values measured for the reversal retention time of 0.1 second at 5 V. As a result of the energization, an aluminum plate BB-1 on a surface of which a protective film was formed was obtained.

Examples BB2 to BB14 and Comparative Examples BB1 to BB10 were conducted and evaluated by the same method as in Example BB1 except that the liquid composition used was replaced with the respective liquid compositions shown in Table 7, thereby obtaining aluminum plates BB-2 to BB-14, BB-51 to BB-60 on a surface of each of which the protective film was formed by the energization.

Incidentally, in each of the aforementioned Examples and Comparative Examples, a fresh aluminum plate was used.

The aforementioned average value of the electric current values as recorded is shown in Table 7 as an amount of the electric current flowed through each of the aluminum plates.

This value was used for evaluating whether or not a protective film could be formed on the anode to enhance insulating properties thereof when aluminum (−1.676 (vs. SHE)) which was more likely to suffer from oxidation than copper (+0.337 (vs. SHE)) in view of the reference electrode potential was used as the anode, and it is therefore considered that the aforementioned value is also used as an index for predicting anti-corrosion properties thereof for other metal members. In addition, it is considered that since the aforementioned procedure was made, in particular, as such a test in which sodium chloride was intentionally added as a source of chlorine ions into the reaction system, the aforementioned value was also usable at the same time for evaluating the degree of removing from the electrode, halide ions that tended to be adsorbed onto the electrode without any influence of an electrical double layer of a surface layer of the electrode owing to high electro-negativity thereof and therefore tended to cause corrosion of the electrode, to thereby protect the metal surface.

TABLE 7

| | | | Examples and Comparative Examples | | | | |
| --- | --- | --- | --- | --- | --- | --- | --- |
| | | | Example BB1 | Example BB2 | Example BB3 | Example BB4 | Example BB5 |
| Compositions | Aluminum plates | | BB-1 | BB-2 | BB-3 | BB-4 | BB-5 |
| | Liquid compositions | Kind | B-1 | B-2 | B-3 | B-4 | B-5 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| | 1.65% NaCl aqueous solution (part(s) by mass) | | 1 | 1 | 1 | 1 | 1 |
| Evaluation | Amount of electric current flowed through aluminum plate (µA) | | 40 | 45 | 50 | 60 | 200 |

| | | | Examples and Comparative Examples | | | | |
| --- | --- | --- | --- | --- | --- | --- | --- |
| | | | Example BB6 | Example BB7 | Example BB8 | Example BB9 | Example BB10 |
| Compositions | Aluminum plates | | BB-6 | BB-7 | BB-8 | BB-9 | BB-10 |
| | Liquid compositions | Kind | B-6 | B-7 | B-8 | B-9 | B-10 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| | 1.65% NaCl aqueous solution (part(s) by mass) | | 1 | 1 | 1 | 1 | 1 |
| Evaluation | Amount of electric current flowed through aluminum plate (µA) | | 60 | 210 | 45 | 40 | 220 |

| | | | Examples and Comparative Examples | | | |
| --- | --- | --- | --- | --- | --- | --- |
| | | | Example BB11 | Example BB12 | Example BB13 | Example BB14 |
| Compositions | Aluminum plates | | BB-11 | BB-12 | BB-13 | BB-14 |
| | Liquid compositions | Kind | B-11 | B-12 | B-13 | B-14 |
| | | Amount (part(s) by mass) | 100 | 100 | 100 | 100 |
| | 2-mol/L Sodium sulfate aqueous solution (part(s) by mass) | | 10 | 10 | 10 | 10 |
| | 1.65% NaCl aqueous solution (part(s) by mass) | | 1 | 1 | 1 | 1 |
| Evaluation | Amount of electric current flowed through aluminum plate (µA) | | 130 | 120 | 280 | 330 |

TABLE 7-continued

|  |  |  | Examples and Comparative Examples ||||| 
|---|---|---|---|---|---|---|---|
|  |  |  | Comparative Example BB1 | Comparative Example BB2 | Comparative Example BB3 | Comparative Example BB4 | Comparative Example BB5 |
| Compositions | Aluminum plates | | BB-51 | BB-52 | BB-53 | BB-54 | BB-55 |
|  | Liquid compositions | Kind | B-51 | B-52 | B-53 | B-54 | B-55 |
|  |  | Amount (part(s) by mass) | 100 | 100 | 100 | 100 | 100 |
|  | 2-mol/L Sodium sulfate aqueous solution (part(s) by mass) | | 10 | 10 | 10 | 10 | 10 |
|  | 1.65% NaCl aqueous solution (part(s) by mass) | | 1 | 1 | 1 | 1 | 1 |
| Evaluation | Amount of electric current flowed through aluminum plate (µA) | | 1600 | 1600 | 2100 | 2400 | 1600 |

|  |  |  | Examples and Comparative Examples ||||| 
|---|---|---|---|---|---|---|---|
|  |  |  | Comparative Example BB6 | Comparative Example BB7 | Comparative Example BB8 | Comparative Example BB9 | Comparative Example BB10 |
| Compositions | Aluminum plates | | BB-56 | BB-57 | BB-58 | BB-59 | BB-60 |
|  | Liquid compositions | Kind | B-56 | B-57 | B-58 | B-59 | B-60 |
|  |  | Amount (part(s) by mass) | 100 | 100 | 100 | 100 | 100 |
|  | 2-mol/L Sodium sulfate aqueous solution (part(s) by mass) | | 10 | 10 | 10 | 10 | 10 |
|  | 1.65% NaCl aqueous solution (part(s) by mass) | | 1 | 1 | 1 | 1 | 1 |
| Evaluation | Amount of electric current flowed through aluminum plate (µA) | | 3200 | 1400 | 1300 | 3500 | 1900 |

Formation of Protective Films

Examples CA1 to CA20 and Comparative Examples CA1 to CA10

<Measurement of Energization through Copper Wire and Amount of Electric Current Flowed Therethrough>

A copper wiring formed of a copper foil wire having a thickness of 0.018 mm and a width of 0.05 mm was produced on a flexible printed board to prepare an anode, whereas a spiral-shaped platinum electrode "TCE-2" available from TOYO TECHNICA Co., Ltd., and an Ag/AgCl reference electrode "TRE-8" available from TOYO TECHNICA Co., Ltd., were prepared as a cathode and a reference electrode, respectively.

The respective liquid compositions shown in Table 8 were weighed in an amount of 100 g and charged into a 200 mL-capacity glass beaker, and further 10 g of a 2 mol/L sodium sulfate aqueous solution previously prepared was added thereto, and the contents of the glass beaker were uniformly mixed with each other.

Then, the copper wiring on the anode side was dipped 10 mm in the resulting mixed liquid, and "TCE-2" on the cathode side was dipped in the liquid such that a whole part of the spiral-shaped portion thereof was immersed in the liquid, and further the reference electrode was also dipped in the liquid. The anode and the cathode were vertically immersed in the liquid in the beaker and fixed therein such that a minimum distance between the anode and the cathode was 20 mm. The reference electrode was also fixed in the liquid in the beaker at the position at which a minimum distance from both of the anode and the cathode to the reference electrode was 15 mm.

Next, a working electrode terminal (WE) and a potential measuring terminal (SE) of a potentiostat "Versa STAT 4" available from TOYO TECHNICA Co., Ltd., were connected to an upper edge portion of the anode, a reference electrode terminal (RE) of the potentiostat was connected to an upper edge portion of the reference electrode, and an auxiliary electrode terminal (CE) of the potentiostat was connected to an upper edge portion of the cathode.

Selecting the cyclic voltammetry from an action menu for the working electrode terminal of the "Versa STAT 4", the energization measurement was conducted by setting an initial potential, a reversal potential and an end potential to 0 V, 5 V and 5 V, respectively, on the basis of the reference electrode, setting a reversal retention time to 0.1 second, and setting a potential sweep rate to 0.01 V/sec.

Among the electric current values thus measured, those electric current values measured for the reversal retention time of 0.1 second were calculated to record an average value thereof. As a result of the energization, a copper wire CA-1 on a surface of which a protective film was formed was obtained.

Examples CA2 to CA20 and Comparative Examples CA1 to CA10 were conducted by the same method as in Example CA1 except that the liquid composition used was replaced with the respective liquid compositions shown in Table 8 to conduct evaluation thereof. As a result, copper wires CA-2 to CA-20 and CA-51 to CA-60 on a surface of each of which a protective film was formed by energization therethrough.

In each of the aforementioned Examples and Comparative Examples, a fresh anode was used.

The electric current values obtained in the aforementioned energization measurement are shown in Table 8 as amounts of the electric current flowed through the respective copper wires.

The lower electric current value means that a protective film having higher insulating properties is formed on a liquid ejection head, so that the resulting liquid ejection head can be prevented from suffering from corrosion.

TABLE 8

| | | Examples and Comparative Examples | | | | |
|---|---|---|---|---|---|---|
| | | Example CA1 | Example CA2 | Example CA3 | Example CA4 | Example CA5 |
| Compositions | Copper wires | CA-1 | CA-2 | CA-3 | CA-4 | CA-5 |
| | Liquid compositions — Kind | C-1 | C-2 | C-3 | C-4 | C-5 |
| | Liquid compositions — Amount (part(s) by mass) | 100 | 100 | 100 | 100 | 100 |
| | 2-mol/L Sodium sulfate aqueous solution (part(s) by mass) | 10 | 10 | 10 | 10 | 10 |
| Evaluation | Measurement of amount of electric current flowed through copper wire (μA) | 45 | 35 | 40 | 25 | 30 |

| | | Examples and Comparative Examples | | | | |
|---|---|---|---|---|---|---|
| | | Example CA6 | Example CA7 | Example CA8 | Example CA9 | Example CA10 |
| Compositions | Copper wires | CA-6 | CA-7 | CA-8 | CA-9 | CA-10 |
| | Liquid compositions — Kind | C-6 | C-7 | C-8 | C-9 | C-10 |
| | Liquid compositions — Amount (part(s) by mass) | 100 | 100 | 100 | 100 | 100 |
| | 2-mol/L Sodium sulfate aqueous solution (part(s) by mass) | 10 | 10 | 10 | 10 | 10 |
| Evaluation | Measurement of amount of electric current flowed through copper wire (μA) | 30 | 30 | 50 | 50 | 45 |

| | | Examples and Comparative Examples | | | | |
|---|---|---|---|---|---|---|
| | | Example CA11 | Example CA12 | Example CA13 | Example CA14 | Example CA15 |
| Compositions | Copper wires | CA-11 | CA-12 | CA-13 | CA-14 | CA-15 |
| | Liquid compositions — Kind | C-11 | C-12 | C-13 | C-14 | C-15 |
| | Liquid compositions — Amount (part(s) by mass) | 100 | 100 | 100 | 100 | 100 |
| | 2-mol/L Sodium sulfate aqueous solution (part(s) by mass) | 10 | 10 | 10 | 10 | 10 |
| Evaluation | Measurement of amount of electric current flowed through copper wire (μA) | 55 | 45 | 55 | 50 | 45 |

| | | Examples and Comparative Examples | | | | |
|---|---|---|---|---|---|---|
| | | Example CA16 | Example CA17 | Example CA18 | Example CA19 | Example CA20 |
| Compositions | Copper wires | CA-16 | CA-17 | CA-18 | CA-19 | CA-20 |
| | Liquid compositions — Kind | C-16 | C-17 | C-18 | C-19 | C-20 |
| | Liquid compositions — Amount (part(s) by mass) | 100 | 100 | 100 | 100 | 100 |
| | 2-mol/L Sodium sulfate aqueous solution (part(s) by mass) | 10 | 10 | 10 | 10 | 10 |
| Evaluation | Measurement of amount of electric current flowed through copper wire (μA) | 75 | 55 | 75 | 75 | 75 |

| | | Examples and Comparative Examples | | | | |
|---|---|---|---|---|---|---|
| | | Comparative Example CA1 | Comparative Example CA2 | Comparative Example CA3 | Comparative Example CA4 | Comparative Example CA5 |
| Compositions | Copper wires | CA-51 | CA-52 | CA-53 | CA-54 | CA-55 |
| | Liquid compositions — Kind | C-51 | C-52 | C-53 | C-54 | C-55 |
| | Liquid compositions — Amount (part(s) by mass) | 100 | 100 | 100 | 100 | 100 |
| | 2-mol/L Sodium sulfate aqueous solution (part(s) by mass) | 10 | 10 | 10 | 10 | 10 |
| Evaluation | Measurement of amount of electric current flowed through copper wire (μA) | 2000 | 1900 | 550 | 500 | 400 |

| | | Examples and Comparative Examples | | | | |
|---|---|---|---|---|---|---|
| | | Comparative Example CA6 | Comparative Example CA7 | Comparative Example CA8 | Comparative Example CA9 | Comparative Example CA10 |
| Compositions | Copper wires | CA-56 | CA-57 | CA-58 | CA-59 | CA-60 |
| | Liquid compositions — Kind | C-56 | C-57 | C-58 | C-59 | C-60 |
| | Liquid compositions — Amount (part(s) by mass) | 100 | 100 | 100 | 100 | 100 |
| | 2-mol/L Sodium sulfate aqueous solution (part(s) by mass) | 10 | 10 | 10 | 10 | 10 |
| Evaluation | Measurement of amount of electric current flowed through copper wire (μA) | 350 | 500 | 950 | 2100 | 2200 |

Formation of Protective Films

Examples CB1 to CB20 and Comparative Examples CB1 to CB10

<Measurement of Energization through Aluminum Plate and Amount of Electric Current Flowed Therethrough>

The aforementioned aluminum anode 1 was used as an anode for the measurement, whereas a spiral-shaped platinum electrode "TCE-2" available from TOYO TECHNICA Co., Ltd., and an Ag/AgCl reference electrode "TRE-8" available from TOYO TECHNICA Co., Ltd., were prepared as a cathode and a reference electrode, respectively.

The respective liquid compositions shown in Table 9 were weighed in an amount of 100 g and charged into a 200 mL-capacity glass beaker, and further 10 g of a 2 mol/L sodium sulfate aqueous solution previously prepared was added thereto, followed by adding 1 g of a 1.65% sodium chloride aqueous solution to the glass beaker, and the contents of the glass beaker were uniformly mixed with each other.

Next, the aluminum plate on the anode side was dipped in the liquid in the beaker such that the portion of the aluminum plate having a width of 3 cm and a thickness of 0.5 mm was immersed in the liquid by 2 cm in its length from a tip end thereof, and "TCE-2" on the cathode side was dipped in the liquid such that a whole part of the spiral-shaped portion thereof was immersed in the liquid, and further the reference electrode was also dipped in the liquid. The anode and the cathode were vertically immersed in the liquid in the beaker and fixed therein such that a minimum distance between the anode and the cathode was 20 mm. The reference electrode was also fixed in the liquid in the beaker at the position at which a minimum distance from both of the anode and the cathode to the reference electrode was 15 mm.

Next, a working electrode terminal (WE) and a potential measuring terminal (SE) of a potentiostat "Versa STAT 4" available from TOYO TECHNICA Co., Ltd., were connected to an upper edge portion of the anode, a reference electrode terminal (RE) of the potentiostat was connected to an upper edge portion of the reference electrode, and an auxiliary electrode terminal (CE) of the potentiostat was connected to an upper edge portion of the cathode.

Selecting the cyclic voltammetry from an action menu for the working electrode terminal of the "Versa STAT 4", an initial potential, a reversal potential upon voltage rise (0 V to 5 V), a reversal potential upon voltage drop (5 V to 0 V), and an end potential were set to 0 V, 5 V, 0 V and 5 V, respectively, on the basis of the reference electrode, a reversal retention time was set to 0.1 second, and a potential sweep rate was set to 0.01 V/sec. The procedure including the voltage rise and voltage drop was repeated 9 times, and the voltage was increased again to 5 V to record an average value of electric current values measured for the reversal retention time of 0.1 second at 5 V.

As a result of the energization, an aluminum plate CB-1 on a surface of which a protective film was formed was obtained.

Examples CB2 to CB20 and Comparative Examples CB1 to CB10 were conducted and evaluated by the same method as in Example CB1 except that the liquid composition used was replaced with the respective liquid compositions shown in Table 9, thereby obtaining aluminum plates CB-2 to CB-20 and CB-51 to CB-60 on a surface of each of which a protective film was formed by the energization.

Incidentally, in each of the aforementioned Examples and Comparative Examples, a fresh aluminum plate was used.

The aforementioned average value of the electric current values as recorded is shown in Table 9 as an amount of the electric current flowed through each of the aluminum plates.

This value was used for evaluating whether or not a protective film could be formed on the anode to enhance insulating properties thereof when aluminum (−1.676 (vs. SHE)) which was more likely to suffer from oxidation than copper (+0.337 (vs. SHE)) in view of the reference electrode potential was used as the anode, and it is therefore considered that the aforementioned value is also used as an index for predicting anti-corrosion properties thereof for other metal members. In addition, it is considered that since the aforementioned procedure was made, in particular, as such a test in which sodium chloride was intentionally added as a source of chlorine ions into the reaction system, the aforementioned value was also usable at the same time for evaluating the degree of removing from the electrode, halide ions that tended to be adsorbed onto the electrode without any influence of an electrical double layer of a surface layer of the electrode owing to high electro-negativity thereof and therefore tended to cause corrosion of the electrode, to thereby protect the metal surface.

TABLE 9

| | | | Examples and Comparative Examples | | | | |
|---|---|---|---|---|---|---|---|
| | | | Example CB1 | Example CB2 | Example CB3 | Example CB4 | Example CB5 |
| Compositions | Aluminum plates | | CB-1 | CB-2 | CB-3 | CB-4 | CB-5 |
| | Liquid compositions | Kind | C-1 | C-2 | C-3 | C-4 | C-5 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| | 1.65% NaCl aqueous solution (part(s) by mass) | | 1 | 1 | 1 | 1 | 1 |
| Evaluation | Amount of electric current flowed through aluminum plate (μA) | | 50 | 40 | 50 | 30 | 35 |

| | | | Examples and Comparative Examples | | | | |
|---|---|---|---|---|---|---|---|
| | | | Example CB6 | Example CB7 | Example CB8 | Example CB9 | Example CB10 |
| Compositions | Aluminum plates | | CB-6 | CB-7 | CB-8 | CB-9 | CB-10 |
| | Liquid compositions | Kind | C-6 | C-7 | C-8 | C-9 | C-10 |
| | | Amount (part(s) by mass) | 100 | 100 | 100 | 100 | 100 |

TABLE 9-continued

|  |  |
|---|---|
| 2-mol/L Sodium sulfate aqueous solution (part(s) by mass) | 10 10 10 10 10 |
| 1.65% NaCl aqueous solution (part(s) by mass) | 1 1 1 1 1 |
| Evaluation — Amount of electric current flowed through aluminum plate (μA) | 35 35 70 70 80 |

| | | | Examples and Comparative Examples | | | | |
|---|---|---|---|---|---|---|---|
| | | | Example CB11 | Example CB12 | Example CB13 | Example CB14 | Example CB15 |
| Compositions | Aluminum plates | | CB-11 | CB-12 | CB-13 | CB-14 | CB-15 |
| | Liquid compositions | Kind | C-11 | C-12 | C-13 | C-14 | C-15 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| | 1.65% NaCl aqueous solution (part(s) by mass) | | 1 | 1 | 1 | 1 | 1 |
| Evaluation | Amount of electric current flowed through aluminum plate (μA) | | 300 | 100 | 350 | 60 | 55 |

| | | | Examples and Comparative Examples | | | | |
|---|---|---|---|---|---|---|---|
| | | | Example CB16 | Example CB17 | Example CB18 | Example CB19 | Example CB20 |
| Compositions | Aluminum plates | | CB-16 | CB-17 | CB-18 | CB-19 | CB-20 |
| | Liquid compositions | Kind | C-16 | C-17 | C-18 | C-19 | C-20 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| | 1.65% NaCl aqueous solution (part(s) by mass) | | 1 | 1 | 1 | 1 | 1 |
| Evaluation | Amount of electric current flowed through aluminum plate (μA) | | 300 | 190 | 180 | 330 | 370 |

| | | | Examples and Comparative Examples | | | | |
|---|---|---|---|---|---|---|---|
| | | | Comparative Example CB1 | Comparative Example CB2 | Comparative Example CB3 | Comparative Example CB4 | Comparative Example CB5 |
| Compositions | Aluminum plates | | CB-51 | CB-52 | CB-53 | CB-54 | CB-55 |
| | Liquid compositions | Kind | C-51 | C-52 | C-53 | C-54 | C-55 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| | 1.65% NaCl aqueous solution (part(s) by mass) | | 1 | 1 | 1 | 1 | 1 |
| Evaluation | Amount of electric current flowed through aluminum plate (μA) | | 1900 | 1900 | 2400 | 2700 | 1900 |

| | | | Examples and Comparative Examples | | | | |
|---|---|---|---|---|---|---|---|
| | | | Comparative Example CB6 | Comparative Example CB7 | Comparative Example CB8 | Comparative Example CB9 | Comparative Example CB10 |
| Compositions | Aluminum plates | | CB-56 | CB-57 | CB-58 | CB-59 | CB-60 |
| | Liquid compositions | Kind | C-56 | C-57 | C-58 | C-59 | C-60 |
| | | Amount (part(s) by mass) | 100 | 100 | 100 | 100 | 100 |
| | 2-mol/L Sodium sulfate aqueous solution (part(s) by mass) | | 10 | 10 | 10 | 10 | 10 |
| | 1.65% NaCl aqueous solution (part(s) by mass) | | 1 | 1 | 1 | 1 | 1 |
| Evaluation | Amount of electric current flowed through aluminum plate (μA) | | 3800 | 1700 | 1600 | 4000 | 2300 |

From the comparison between the aforementioned Examples and Comparative Examples, it was confirmed that when using the liquid composition of the present invention, it is possible to form a protective film that is capable of enhancing insulating properties for a liquid ejection head of an ink-jet type.

REFERENCE SIGNS LIST

1: Print head
10: Ink-jet head
11: Silicon substrate
12: Vibration plate
13: Pressure chamber
14: Metal oxide layer
16: First electrode layer
17: Piezoelectric body layer
18: Second electrode layer
20: Nozzle plate
21: Ejection port
30: Drive circuit

The invention claimed is:

1. A liquid composition for ink-jet printing, comprising not less than 0.01% by mass and not more than 1.5% by mass of a compound represented by the following formula (1) or a salt thereof, not less than 0.05% by mass and not more than 35% by mass of a compound represented by the following formula (2), and water:

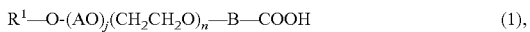

$$R^1\text{—O-(AO)}_j(CH_2CH_2O)_n\text{—B—COOH} \quad (1),$$

wherein $R^1$ is a linear or branched aliphatic hydrocarbon group having not less than 2 and not more than 7 carbon atoms, or an alicyclic hydrocarbon group having not less than 3 and not more than 8 carbon atoms; AO is an alkyleneoxy group having 3 or 4 carbon atoms; B is an alkylene group having not less than 1 and not more than 3 carbon atoms; and j and n represent average molar numbers of addition of (AO) and ($CH_2CH_2O$), respectively, in which j is a number of not less than 0 and not more than 1, n is a number of not less than 5 and not more than 20, and when j is more than 0 (j>0), the groups of (AO) and ($CH_2CH_2O$) may be arranged in any order; and

$$R^2\text{—O-(AO)}_k(CH_2CH_2O)_m\text{—H} \quad (2),$$

wherein $R^2$ is a linear or branched aliphatic hydrocarbon group having not less than 2 and not more than 7 carbon atoms, or an alicyclic hydrocarbon group having not less than 3 and not more than 8 carbon atoms; AO is an alkyleneoxy group having 3 or 4 carbon atoms; and k and m represent average molar numbers of addition of (AO) and ($CH_2CH_2O$), respectively, in which k is a number of not less than 0 and not more than 1, m is a number of not less than 6 and not more than 21, and when k is more than 0 (k>0), the groups of (AO) and ($CH_2CH_2O$) may be arranged in any order, wherein a mass ratio of the compound represented by the formula (1) to the compound represented by the formula (2) [compound represented by the formula (1)/ compound represented by the formula (2)] is not less than 0.001 and not more than 0.30.

2. The liquid composition for ink-jet printing according to claim 1, wherein a total content of the compound represented by the formula (1) and the compound represented by the formula (2) in the liquid composition is not less than 1% by mass and not more than 30% by mass.

3. The liquid composition for ink-jet printing according to claim 1, wherein n and m have the following relationship (A) therebetween:

$$m-5 \leq n \leq m+5 \quad (A).$$

4. The liquid composition for ink-jet printing according to claim 1, wherein a difference between the number of carbon atoms in $R^1$ and the number of carbon atoms in $R^2$ is not more than 2.

5. The liquid composition for ink-jet printing according to claim 1, wherein a content of water in the liquid composition is not less than 30% by mass and not more than 95% by mass.

6. The liquid composition for ink-jet printing according to claim 1, wherein a pH value of the liquid composition is not less than 7 and not more than 11.

7. The liquid composition for ink-jet printing according to claim 1, further comprising a colorant.

8. An ink-jet image-forming method comprising the step of ejecting the liquid composition for ink-jet printing according to claim 1 from a liquid ejection head of an ink-jet type comprising an ejection energy-generating element to form characters or images.

9. A method of forming a protective film on a liquid ejection head of an ink-jet type comprising an ejection energy-generating element, comprising the step of applying a voltage to the ejection energy-generating element under such a condition that the ejection energy-generating element is allowed to contact with the liquid composition for ink-jet printing according to claim 1.

10. The method of forming a protective film according to claim 9, wherein the ejection energy-generating element is a piezoelectric element or an electro-thermal conversion element.

11. The method of forming a protective film according to claim 9, wherein the ejection energy-generating element comprises a metal electrode or a conductive metal oxide electrode.

12. The method of forming a protective film according to claim 9, wherein the liquid ejection head comprises a nozzle plate comprising ejection ports for ejecting a liquid, and the ejection energy-generating element;

the ejection energy-generating element comprises a substrate in which a pressure chamber is formed, a first electrode formed on one surface of the substrate, a piezoelectric body formed on the first electrode, and a second electrode formed on the piezoelectric body; and the step of applying a voltage is a step of applying a voltage to the ejection energy-generating element under such a condition that the pressure chamber is filled with the liquid composition.

13. A method of storing a liquid ejection head of an ink-jet type comprising an ejection energy-generating element, comprising the steps of:

applying a voltage to the ejection energy-generating element under such a condition that the ejection energy-generating element is allowed to contact with the liquid composition for ink-jet printing according to claim 1; and filling the liquid ejection head with an ink after the step of applying a voltage to the ejection energy-generating element.

14. The liquid composition for ink-jet printing according to claim 1, wherein the compound represented by the formula (1) is at least one compound selected from the group consisting of the following compounds 1-1 to 1-3 and 1-5 to 1-6, Compound 1-1: n-hexyl-O—$(CH_2CH_2O)_9$—$CH_2COOH$,
Compound 1-2: $CH_3CH_2$—O—$(CH_2CH_2O)_9$—$CH_2COOH$,
Compound 1-3: n-butyl-O—$(CH_2CH_2O)_9$—$CH_2COOH$,
Compound 1-5: n-hexyl-O—$(CH_2CH_2O)_5$—$CH_2COOH$, and
Compound 1-6: n-hexyl-O—$(CH_2CH_2O)_{19}$—$CH_2COOH$.

15. The liquid composition for ink-jet printing according to claim 1, wherein the compound represented by the formula (2) is at least one compound selected from the group consisting of the following compounds 2-1 to 2-3 and 2-5 to 2-6, Compound 2-1: n-hexyl-O—$(CH_2CH_2O)_{10}$—H,
Compound 2-2: $CH_3CH_2$—O—$(CH_2CH_2O)_{10}$—H,
Compound 2-3: n-Bu-O—$(CH_2CH_2O)_{10}$—H,
Compound 2-5: n-hexyl-O—$(CH_2CH_2O)_6$—H, and
Compound 2-6: n-hexyl-O—$(CH_2CH_2O)_{20}$—H.

16. The liquid composition for ink-jet printing according to claim 1, further comprising at least one organic solvent selected from the group consisting of glycol ether other than the compound represented by the formula (2), polyhydric alcohol, monohydric alcohol, alkyl ether of alcohol, nitrogen-containing heterocyclic compound, amide, amine and sulfur-containing compound.

17. The liquid composition for ink-jet printing according to claim 16, wherein a content of the organic solvent in the liquid composition is not less than 5% by mass and not more than 60% by mass.

18. An ink comprising the liquid composition for ink-jet printing according to claim 1.

19. A filling liquid that is used for shipping or maintenance of an apparatus comprising the liquid composition for ink-jet printing according to claim 1.

20. The liquid composition for ink-jet printing according to claim 1, wherein a content of the compound represented by formula (2) is not less than 3% by mass and not more than 35% by mass.

\* \* \* \* \*